(12) United States Patent
Spiesberger

(10) Patent No.: US 11,408,971 B1
(45) Date of Patent: Aug. 9, 2022

(54) COMPUTERIZED ESTIMATION OF MINIMUM NUMBER OF SONIC SOURCES USING MAXIMUM MATCHING OF A BIPARTITE GRAPH

(71) Applicant: Scientific Innovations, Inc., Radnor, PA (US)

(72) Inventor: John Louis Spiesberger, Radnor, PA (US)

(73) Assignee: Scientific Innovations, Inc., Radnor, PA (US)

( * ) Notice: Subject to any disclaimer, the term of this patent is extended or adjusted under 35 U.S.C. 154(b) by 0 days.

(21) Appl. No.: 17/366,888

(22) Filed: Jul. 2, 2021

(51) Int. Cl.
| | |
|---|---|
| *G01S 5/18* | (2006.01) |
| *G06K 9/62* | (2022.01) |
| *A01K 11/00* | (2006.01) |
| *A01K 61/90* | (2017.01) |
| *G06K 9/00* | (2022.01) |
| *G01V 1/00* | (2006.01) |
| *G06V 20/64* | (2022.01) |

(52) U.S. Cl.
CPC .............. *G01S 5/18* (2013.01); *A01K 11/006* (2013.01); *A01K 61/90* (2017.01); *G01V 1/001* (2013.01); *G06K 9/00536* (2013.01); *G06K 9/6267* (2013.01); *G06V 20/64* (2022.01)

(58) Field of Classification Search
CPC ......... G01S 5/18; A01K 61/90; A01K 11/006; G06V 20/64; G01V 1/001; G06K 9/00536; G06K 9/6267
See application file for complete search history.

(56) References Cited

U.S. PATENT DOCUMENTS

| | | | |
|---|---|---|---|
| 7,219,032 B2 | 5/2007 | Spiesberger |
| 7,363,191 B2 | 4/2008 | Spiesberger |
| 8,010,314 B2 | 8/2011 | Spiesberger |
| 8,311,773 B2 | 11/2012 | Spiesberger |
| 8,639,469 B2 | 1/2014 | Spiesberger |
| 10,379,218 B1 | 8/2019 | Spiesberger |

(Continued)

OTHER PUBLICATIONS

Buckland, S.T. et al.; Distance Sampling: Estimating Abundance of Biological Populations; Biometrics 50; Chapman and Hall, London; 1993.

(Continued)

*Primary Examiner* — Isam A Alsomiri
*Assistant Examiner* — Amie M Ndure
(74) *Attorney, Agent, or Firm* — Louis J. Hoffman; David S. Alavi

(57) ABSTRACT

A computerized machine (a) determines temporal and spatial confidence intervals for each one of plural sonic events, (b) classifies pairings among the sonic events as either comparable or non-comparable, and (c) estimates a minimum number of sonic sources, some of which are in motion, that could have produced or generated the sonic events. Sonic event times and positions are characterized by corresponding temporal and spatial confidence intervals. A pairing of sonic events is classified as comparable only when that pairing meets one or more preselected constraints, some of which depend on the temporal and spatial confidence intervals. The estimated minimum number of sonic sources is equal to the total number of sonic events minus the cardinality of a maximum matching of a bipartite graph derived from the classifications of the pairings and a chronological ordering of the set of sonic events.

24 Claims, 7 Drawing Sheets

(56) References Cited

U.S. PATENT DOCUMENTS

| | | |
|---|---|---|
| 10,929,506 B1 | 2/2021 | Spiesberger |
| 2013/0272548 A1 | 10/2013 | Visser |

OTHER PUBLICATIONS

Cormen, Thomas H. et al.; Section 26.2: The FordFulkerson method; Introduction to Algorithms (Third Ed.), MIT Press; pp. 708-766; 2009.

Dufoss, Fanny et al; Approximation algorithms for maximum matchings in undirected graphs; CSC 2018—SIAM Workshop on Combinatorial Scientific Computing, Bergen, Norway; pp. 56-65; Jun. 2018.

Dilworth, R. P.; A Decomposition Theorem for Partially Ordered Sets; Annals of Mathematics, Second Series, vol. 51, No. 1; pp. 161-166; Jan. 1950.

Freese, Ralph et al.; Free Lattices; American Mathematical Society, vol. 42, p. 221-229; 1995.

NetworkX; documentation page at https://networkx.github.io/; Oct. 2019.

Gabow, Harold N.; The Weighted Matching Approach to Maximum Cardinality Matching; Fundamenta Informaticae, vol. 154, No. 1-4; Mar. 10, 2017.

Kuhn, H.W.; The Hungarian Method for the Assignment Problem, Naval Research Logistics Quarterly; vol. 2, Issue 1-2; Mar. 1955.

Mucha, Marcin and Sankowski, Piotr; Maximum Matchings via Gaussian Elimination; Proceedings of the 45th Annual IEEE Symposium on Foundations of Computer Science (FOCS'04), Rome, Italy; pp. 248-255; 2004.

Spiesberger, John L. et al.; Reliable lower bound for number of calling marine mammals in Chukchi sea (Abstract) Journal of the Acoustical Society of America, 146, 2806; 2019.

Spiesberger, John L. et al.; Locating and Censusing Calling Marine Mammals Amongst Black Holes (Abstract); Alaska Marine Science Symposium, Anchorage Alaska; Jan. 27-31, 2020.

Uno, Takeaki; Algorithms for Enumerating All Perfect, Maximum and Maximal Matchings in Bipartite Graphs, ISAAC 97: Proceedings of the 8th International Symposium on Algorithms and Computation; pp. 92-101; Dec. 1997.

Xu, Chi; EnumMatching; software download available at https://github.com/charlesxuuu/EnumMatching; May 2016.

Xu, Guangzhi; bipartite matching; software download available at https://github.com/Xunius/bipartite_matching; Jun. 2017.

Raftery, Adrian E. and Zeh, Judith E.; Estimating Bowhead Whale Population Size and Rate of Increase from the 1993 Census; Journal of the American Statistical Association, vol. 93, No. 442, pp. 451-463; Jun. 1998.

Ikiz, S. and Garg, Vijay K.; Online Algorithms for Dilworth's Chain Partition; Parallel and Distributed Systems Laboratory, Dept. of Electrical and Computer Eng., The University of Texas at Austin, Austin TX 78712; 2004.

Jacoby, David M.P. and Freeman, Robin; Emerging Network-Based Tools in Movement Ecology; Trends in Ecology & Evolution, vol. 31; Apr. 2016.

Jacoby, David M.P. et al.; Developing a deeper understanding of animal movements and spatial dynamics through novel application of network analyses; Methods in Ecology and Evolution; British Ecological Society; 2012.

Jacoby, David M.P. et al.; Inferring animal social networks and leadership: applications for passive monitoring arrays; Journal of the Royal Society Interface 13; Nov. 2016.

Cheriyan, Joseph; Randomized $\tilde{O}(M|V|)$) Algorithms for Problems in Matching Theory; Siam J. Comput, vol. 26, No. 6, pp. 1635-1655, Dec. 1997.

Clark, Chistopher W. et al.; Distribution and Behavior of the Bowhead Whale, Balaena mysticetus, Based on Analysis of Acoustic Data Collected During the 1993 Spring Migration off Point Barrow, Alaska; Report—International Whaling Commission, 46, pp. 541-552; Jan. 1996.

Corneil, Derek G. et al.; LDFS-based Certifying Algorithm for the Minimum Path Cover Problem on Cocomparability Graphs; SIAM J. Comput., vol. 42, No. 3, pp. 792-807; 2013.

Felsner, Stefan et al.; Recognition Algorithms for Orders of Small Width and Graphs of Small Dilworth Number; Order 20, 351-364; Oct. 23, 2003.

Flier, Holger et al.; Vertex Disjoint Paths for Dispatching in Railways; WthWorkshop on Algorithmic Approaches for Transportation Modelling, Optimization, and Systems (ATMOS'10); pp. 61-73; Sep. 6-10, 2010.

Chen, Yangjun and Chen, Yibin; On the DAG Decomposition; British Journal of Mathematics & Computer Science 2015.

Dantzig, G.B. et al.; Linear Inequalities and Related Systems (AM-38); Chapter VII, A Primal-Dual Algorithm for Linear Programs; pp. 171-181; Princeton University Press; Oct. 21, 1956.

Erickson, Jeff; Algorithms; complete text (2019); available at https://archive.org/details/Algorithms-Jeff-Erickson.

Duan, Ran and Pettie, Seth; Linear-Time Approximation for Maximum Weight Matching; J. ACM, 61,1, 23 pp (2014); DOI:http://dx.doi.org/10.1145/2529989.

| Call | X(m) | Y(m) | t(s) |
|---|---|---|---|
| 1 | 2375.4 | 4534.5 | 0 |
| 2 | 8242.8 | 6090.4 | 0 |
| 3 | 9657.5 | 7755.3 | 0 |
| 4 | 9726 | 6416.1 | 0 |
| 5 | 1702.1 | 4288.9 | 200 |
| 6 | 8300.9 | 6581 | 200 |
| 7 | 9958.4 | 7714.9 | 200 |
| 8 | 10005.7 | 7090.3 | 200 |
| 9 | -112.5 | 3731.8 | 400 |
| 10 | 8444.8 | 7998.1 | 400 |
| 11 | 11743.6 | 7222 | 400 |
| 12 | 10252.8 | 7470.1 | 400 |
| 13 | -543.5 | 3667.4 | 600 |
| 14 | 8446.3 | 8647.3 | 600 |
| 15 | 13067.5 | 6909.8 | 600 |
| 16 | 11176.8 | 8950.2 | 600 |
| 17 | -1144.7 | 3451.5 | 800 |
| 18 | 8420.9 | 9200.7 | 800 |
| 19 | 13540.9 | 6867.4 | 800 |
| 20 | 11285.4 | 9200.4 | 800 |
| 21 | -2924.9 | 3004.1 | 1000 |
| 22 | 8415.2 | 10591.6 | 1000 |
| 23 | 14678 | 6906.2 | 1000 |
| 24 | 11517.8 | 9612.1 | 1000 |

COMPUTERIZED ESTIMATION OF MINIMUM NUMBER OF SONIC SOURCES USING MAXIMUM MATCHING OF A BIPARTITE GRAPH

FIELD OF THE INVENTION

The field of the present invention relates to computerized data processing or analysis of acoustic waves or signals normally representative of discrete sonic events. In particular, computerized machines and methods are disclosed for estimating a minimum number of sonic sources that could have produced or generated a set of discrete sonic events. Specifically, the machine and techniques have particular practical application with respect to determining the number of calling animals, such as whales or other sea animals, or terrestrial animals such as birds, frogs, or mammals, in a vicinity of one or more sonic receivers.

BACKGROUND

The disclosed computerized estimation machine and techniques may (not must) achieve various practical objects and offer various practical advantages, including offering new ways to estimate abundance of sonic sources based on reasonably reliable locations of each sound produced or generated by those sources without knowing precise location or having identifiable information.

In particular, people use acoustic data to locate calling animals such as whales. Scientists use such data to study animal behavior, and commercial or governmental entities use such data to avoid harming such wildlife with loud or disturbing sounds, such as emitted by active sonar pings from Navy or commercial ships or air-guns from oil-exploration ships, to name only two. On land or in the air above sea or land, disturbing sounds can include sounds from aircraft, cars or other vehicles, gun shots, or controlled explosions, for example. People also use acoustic data to estimate abundance of calling animals by species, or to estimate the effects on abundance from such disturbances or from related factors such as urbanization and deforestation.

In performing such calculations or estimations, however, a common problem is to know how many sources are producing or generating a series of received sounds. For example, suppose we hear N whale calls but cannot directly observe each animal and do not recognize particular animals from the call. How many animals did we hear? The sounds, in theory, could have been produced or generated by one animal calling N times, by N animals each calling once, or by some intermediate numbers of animals. The answer may change significantly a decision made or an action taken based on such data. For example, regulations may allow use of active sonar in areas where only a few whales are nearby but not where many whales congregate. Or a scientist, government, or environmental organization may wish to estimate the whale population in a given area at a given time, and merely hearing N calls may not answer the question.

Various known techniques exist for estimating location of a given call received. Estimated location can be derived, for example, by various triangulation techniques, i.e., intersecting directions from the source for disparate receivers, or even from a single receiver, directional or otherwise. Other means to passively locate emitted sounds include use of time differences of arrival (TDOA) at widely separated receivers, sequential bound estimation (e.g., U.S. Pat. No. 7,219,032 to this inventor), spherical beamforming, or matched field processing. TDOA techniques are disclosed, for example, by work of this inventor and others published at Spiesberger, J. L., Berchok, C. L., Woodrich, D., Iyer, P. G., Schoeny, A., and Sivakumar, K., *Reliable lower bound for number of calling marine mammals in Chukchi Sea*, J. Acoust. Soc. Am. 146(4), 28062807, doi: 10.1121/1.5136724 (2019) and Spiesberger, J. L., Berchok, C. L., Woodrich, D., Schoeny, A., Iyer, P. G., Yang, E., Lee, E., Iyer, P., and Sivakumar, K., *Locating and censusing calling marine mammals in the Chukchi Sea with time differences of arrival amongst black holes of 2D models*, https://www.alaskamarinescienceorg/agenda, Alaska Marine Science Symposium, Anchorage, Ak. (2020).

The machines and techniques disclosed are not expected to have practical value where the sounds are known to have emanated from identified sources with known exact locations, such as with sounds received from airplanes with GPS receivers on them, sounds received from animals tagged with tracking devices, or sounds received from subjects that have been observed (visually or otherwise) at logged locations. The machines and techniques disclosed typically operate on discrete sounds, where it is not clear whether a common source emitted different sounds apparently coming from different locations, or at least have maximum practical use with respect to discrete sounds. "Discrete sounds" refers to sounds from a single source that the receivers do not detect continuously over a period of time of interest to a user, either because the source does not emit the sound continuously or because of interruptions that hamper detection for various reasons, such as variations in noise that interrupt the signal intermittently or fading of paths due to destructive interference in multipath scenarios. Such discrete sounds are called "sonic events," or "calls," in this disclosure. By contrast, it is typically easier to calculate the minimum number of sources from a set of continuous sounds, because information about whether a sound continued or not may make it easier to infer whether sounds at different locations emanate from a single traveling source or multiple sources.

Location-estimation techniques may include estimates of reliability, such as a confidence interval, and such is used by the disclosed techniques. Confidence intervals can have various forms. For example, a location technique may have uncertainty within a range but provide full certainty that the location falls within that range. Or the location technique may identify a confidence interval by setting a given confidence level, such as a 99% or 95% probability, whether Gaussian or other distributions are used. The choice of confidence level or estimation of confidence interval is delegated to the user in view of the specifics of the particular measurement technique and application. The disclosed approach, however, has lower practical application in situations where the confidence interval is unknown or unreliable or cannot be estimated reasonably.

The machines and techniques disclosed typically operate on data collected for calls of a common sort, or at least have maximum benefit for a class of such calls. For example, in instances where it is possible to distinguish between whale calls and walrus calls, one might wish to apply the technique separately to two data sets. Likewise, the machines and techniques have maximum practical use when it is not possible to identify specific individuals within the class being considered. If sounds cannot be classified, on the other hand, there may be a benefit to applying the disclosed machines and techniques to a group of calls from disparate species of animals. As a result, the machines and techniques need not operate on data collected for calls of a particular type or from a particular species of sea animal. Such data classification decisions are at the discretion of the user for any individual instance or data set.

Persons skilled in the art of animal location or statistical estimation have recognized difficulties in estimating abundance of animals from estimated location data of discrete calls. For example, despite being trained statisticians, the authors of Raftery and Zeh, *Estimating bowhead whale population size and rate of increase from the* 1993 *census*, Journal of the American Statistical Association 93(442), 257 451-63, (1998), used location data derived from time-difference-of-arrival (TDOA) and other methods to estimate the abundance of whales in the Arctic, but felt it necessary to state: "In some cases it is impossible to know whether different locations correspond to different whales." They recognized the problem with the reliability of the point measurements but, instead of innovating to estimate abundance in a reliable way, they estimated abundance using many assumptions about the behavior of whales. Those authors are not alone: methods employed to estimate abundance are frequently riddled with a wide variety of assumptions whose validity are often difficult to determine. Another example is found in Buckland, S., et al., *Distance sampling: Estimating abundance of biological populations*, Biometrics 50 (1993) (available at doi: 10.2307/2532812). The machines and techniques disclosed herein, by contrast, do not require possibly unreliable assumptions and therefore offer robust estimates of animal abundance (and tracks) that are more reliable and thus may be more believable.

Brute force calculations typically have little practical value because the problem requires calculation complexity that grows dramatically with the amount of data. Suppose the data set includes data for 100 calls produced or generated at different estimated locations and at different estimated times. It is possible to estimate which calls are consistent with which others: For example, if a whale would have had sufficient time to swim from one location to another, given an estimate of an animal's speed, we might consider the two calls consistent with one another. To illustrate how such observations alone do not suffice to allow a brute force calculation, imagine that the first call's location is consistent with 20 other call locations, the second call is consistent with 42 other call locations, the third call is consistent with 30 other call locations, a fourth call is consistent with 19 other call locations, and so forth. A brute force method might start with the hypothesis that there is only one animal, but we could easily exclude that case by noticing a location inconsistent with one of the calls. In our example, the first call's location is inconsistent with 80 of the 100 call locations, so one animal could not have produced or generated all of the sounds. Next, the brute force method hypothesizes two animals and attempts to determine if there is a starting location where each of the two animals could each travel fast enough to reach (between them) each of the 100 locations. That is not so easy, compared to proving or refuting the one-animal hypothesis. Just because no two call locations in our example are compatible with all 100 locations (if that is the case when considering the other 96 points as well) does not mean that a path cannot be found for two animals to reach all 100 locations. Even if we refute the two-animal hypothesis, we must proceed to hypothesizing three animals, then four, and so on until we find the minimum number of animals and their associated tracks wherein the locations corresponding to each of the 100 calls are visited by one of those animals. Just because the first four calls, in our example, are compatible with more than 100 locations collectively, also, does not mean that the paths can be found for four animals to start at those locations and eventually reach all 100 locations at the times specified. The number of checks required to implement a brute force technique is on the order of N! (N-factorial), so for example, with 100 call locations, something on the order of 100! checks would be required, but 100! equals a number greater than $9 \times 10^{157}$. Computing using the brute force method, therefore, is not possible with any computer except in cases with a very small number of data points, or in other idealized cases, such as those where no pairs of locations are compatible, because the time to reach a solution using any brute force method increases more than exponentially with the number of data points.

In previous work by this inventor (U.S. Pat. No. 10,929, 506, incorporated by reference as if set forth herein in its entirety; referred to as the '506 patent), a method was disclosed for estimating a lower bound for the minimum number of sonic sources that could have produced or generated the set of plural sonic events (discussed further below).

SUMMARY

A method performed using a computerized machine includes (a) determining corresponding temporal and spatial confidence intervals for each of a set of plural sonic events, (b) classifying certain pairings among the plural sonic events as comparable, and (c) estimating a minimum number of sonic sources that could have produced or generated the set of plural sonic events.

The sonic events arise from an unknown number of sonic sources of a specified class of sonic sources, at least one of which is not at a known and fixed location. For purposes here, the term "in motion" means that a source of the sonic event is not known to be fixed. In other words, that source is moving with respect to the location of at least one of the receivers, or at least is potentially in motion during an observation period. It need not be known that the source is moving continuously at any particular time within a given time interval; the source may be moving only intermittently, such as with stops and starts. The velocity need not be known or estimated either, nor need it be fixed.

For each sonic event, an event time is characterized by a temporal confidence interval, and an event position is characterized by a spatial confidence interval. The sonic events are chronologically ordered according to their corresponding temporal confidence intervals. For each pairing of two different sonic events of the set arranged in the chronological order, that pairing is classified as comparable only when that pairing meets a set of one or more preselected constraints; at least some of those constraints depend on the temporal confidence intervals and the spatial confidence intervals.

The estimated minimum number of sonic sources that could have produced or generated the plural sonic events is calculated as being equal to the total number of sonic events minus the cardinality of a maximum matching of a bipartite graph summed across disjoint subsets of sonic events.

A programmed computerized machine, comprising one or more electronic processors and one or more tangible computer-readable storage media operationally coupled to the one or more processors, is structured and programmed to perform the methods disclosed herein. An article, comprising a tangible medium that is not a propagating signal, encodes computer-readable instructions that, when applied to a computerized machine, program the computerized machine to perform the methods disclosed herein.

A method performed using a computerized machine can further include generating a set of distinct paths. Each of the paths denotes an estimated path for one of the estimated minimum number of corresponding sonic sources that, together with the other sonic sources of the estimated minimum number of the sonic sources, could have produced or generated all of the plural sonic events.

Paths can be generated by partitioning the chronologically ordered set of plural sonic events into a set of mutually disjoint subsets using the maximum matching, each path corresponding to one of the disjoint subsets. Every pairing of two different sonic events of a given path is classified as comparable.

Objects or advantages may become apparent upon referring to the examples illustrated in the drawings or disclosed in the following written description.

This Summary is provided to introduce a selection of concepts in a simplified form that are further described below in the Detailed Description. This Summary is not intended to identify key or essential features or to limit the scope of disclosed subject matter.

BRIEF DESCRIPTION OF THE DRAWINGS

FIG. 1 is a table showing event positions and times for an example series of 24 sonic events.

FIG. 2 is an adjacency matrix constructed for the sonic events listed in FIG. 1.

Figure 3:
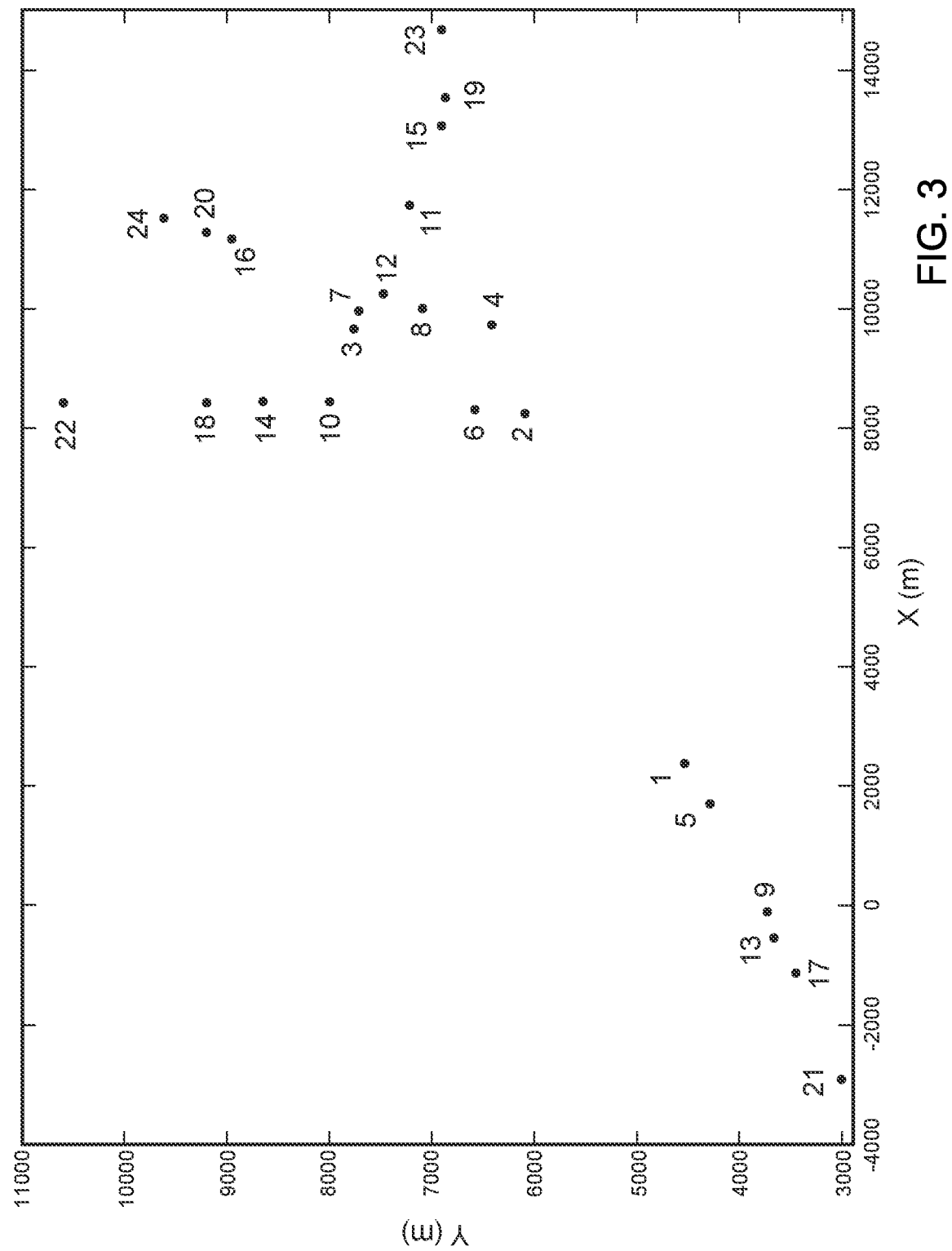
FIG. 3 is a spatial plot of the sonic events listed in FIG. 1.

The examples depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The drawings show examples only and thus should not be construed as limiting the scope of the present disclosure.

DETAILED DESCRIPTION

Disclosed is a specific, improved computerized machine (including programmed computer or tangible storage medium that contains or stores computer program instructions) and associated techniques (methods or processes) capable of computer-estimating the minimum number of sonic sources that collectively produce or generate a time series of sounds, each sound emanating from an estimated but not precisely known location.

Further disclosed are computerized machines and associated techniques for determining possible tracks for each sonic source that could result in the time series of sounds.

For ease of description, this disclosure initially describes an example central process, with only some discussion of variations. It is intended, though, that the disclosed central process, and equivalents thereof, can be modified to create variations. The remainder of the disclosure refers to calling animals with sounds propagating undersea, for example, but it is understood that the disclosed machine and techniques have application to other sonic sources aside from animals, including in some instances human-created machines such as aircraft or ships, and for sounds propagating in fluids other than the sea, including the Earth's atmosphere. Reference to "sea" may include any body of water, including for example oceans, lakes, rivers, and bays, and may in some instances refer to man-made bodies of water, such as pools or catch-ponds. References to "water" may include saltwater or freshwater, as well as other fluids, or mixes of fluids, and may include suspended particulate matter or natural (e.g., fish) or artificial items (e.g., submarines) swimming in or otherwise traversing such fluids. An example of a possible application in an aircraft setting is estimating the number of aircraft or drones passively from sounds received at different locations at different times. Another example involves doing the same for ships or submarines based on sounds received.

An unknown number of sonic sources of a specified class (e.g., animals, vessels, aircraft, vehicles) produce or generate collectively a set (i.e., a time series) of plural discrete sonic events. One or more of the sonic sources are in motion; in some instances most, nearly all, or all of the sonic sources can be in motion. Each estimated sonic event position can be characterized by a corresponding spatial confidence interval; each estimated sonic event time can be characterized by a corresponding temporal confidence interval. The sonic event times may be overlapping in some instances.

A method, implemented using a programmed computerized machine, includes (a) determining corresponding temporal and spatial confidence intervals for each sonic event, (b) based on the confidence intervals, classifying certain pairings of those sonic events as comparable, and (c) based on the classifications of the pairings, estimating a minimum number of sonic sources that could have produced or generated the plural sonic events. The method can further include computing estimates of the paths traversed by the estimated minimum number of sonic sources to produce or generate the plural sonic events. The disclosed methods need not, and typically do not, include collection of the data indicative of the set of sonic events. In many examples the method is employed using only data that are indicative of reception of sonic signals originating from the sonic sources (i.e., including only signals actively produced or generated at the sonic source; excluding signals produced or generated elsewhere and reflected, redirected, or retransmitted by the sonic source).

In some examples, the sonic sources can include one or more specified species of animal, and the plural sonic events are intermittently received calls of animals of the one or more specified species. In some of those examples, the specified class of sonic sources can include, e.g., one or more specified species of marine or aquatic animal, one or more specified species of marine mammal, or only a single specified species of whale. In other examples, the specified class of sonic sources can include, e.g., one or more specified species of terrestrial animals such as birds, frogs, insects, and mammals.

In some examples, the specified class of sonic sources includes one or more specified types of marine or aquatic vessel, and the plural sonic events comprise a specified type of sound intermittently received from the specified vessels.

In some examples, the specified class of sonic sources includes one or more specified types of land vehicle, and the plural sonic events comprise a specified type of sound intermittently received from the specified vehicles.

In some examples, the specified class of sonic sources includes one or more specified types of aircraft, and the plural sonic events comprise a specified type of sound intermittently received from the specified aircraft.

In some examples, the specified class of sonic sources includes one or more specified types of land-based, shipboard, or airborne weaponry, and the sonic events comprise a specified type of sound intermittently received from the specified weaponry.

For each sonic event of the time series of plural sonic events, corresponding event times and positions can be estimated in any suitable way. In some examples the event position can be defined in three dimensions; in some other examples the event position can be defined in only two dimensions (in some of those instances, even if three-dimensional motion of the sonic sources can occur).

The table of FIG. 1 is an exemplary time sequence of estimated two-dimensional event locations and corresponding estimated event times for a sequence of 24 distinct sonic events (e.g., calls of a specified whale species). In some examples, event positions can be estimated using one or more suitable techniques, e.g., time-differences-of-arrival (TDOA), sequential bound estimation (SBE), spherical beamforming, or match field processing. In TDOA, differences of arrival times of sound from a given sonic event, at multiple sonic sensors at multiple different sensor positions, are used along with the sensor locations to estimate the location of the source of that sonic event (e.g., by triangulation). The estimated event position and the arrival times can be used to estimate the corresponding event time.

The estimated event location and time are typically inexact, due to uncertainties of sound propagation speed or the sound propagation paths, as well as uncertainties (if any) of the sensor positions or measured time differences. The sonic event position and time are therefore characterized by corresponding spatial and temporal confidence intervals determined for the sonic event. Determination of spatial and temporal confidence intervals can include selection of a suitable confidence level (e.g., 95%, 99%, or 100%), which can be the same for all of the plural sonic events or can vary among the plural sonic events. The confidence levels can be adjusted as needed or desired to refine or test the results of the inventive method (discussed further below).

Each temporal confidence interval, if convenient, can be characterized by one or more corresponding parameters, including one or more of (i) an earlier bound, (ii) a later bound, or (iii) a center (i.e., midway between the earlier bound and the later bound). The sonic event may not be instantaneous but may extend for a period of time. Thus, the temporal confidence interval may refer, for example, to the estimated variation of the start of the call, the middle of a call, or the end of a call, as seems most suitable for the particular problem.

Each spatial confidence interval can be characterized by a boundary of a corresponding two- or three-dimensional region of space in which the sonic event is estimated to have occurred. The boundary can be regular or irregular. Regular regions in two-dimensional space can include, for example, circular, elliptical, rectangular, or square boundaries. Regular regions in three-dimensional space can include, for example, spherical, spheroidal, ellipsoidal, rectangular prismatic, or cubical boundaries. In some instances, the spatial confidence interval can include disjoint spatial regions, such as if there are insufficient sonic data or if a portion of an estimated special region is impossible (e.g., a peninsula dividing the calculated region within a body of water in which a whale is estimated to be located).

For example, in two-dimensional locations determined with TDOA, using only three receivers can result in disjoint spatial regions for the sonic event's estimated location; using four or more receivers resolves any such ambiguity. If needed or desired those boundaries can be parameterized in any suitable way (e.g., largest transverse extent, or area or volume centroid). If details of probability distributions underlying the temporal or spatial confidence intervals are available (e.g., derived from probability distributions for sound propagation speeds or distances), additional confidence interval parameters can include, e.g., a peak of the corresponding distribution, a centroid of the corresponding distribution, or a first moment of the corresponding distribution.

The temporal and spatial confidence intervals can be determined in any suitable way, based on any suitable measurement or reception of sonic signals produced or generated by the sonic sources, using any suitable array of sonic sensors (e.g., microphones, hydrophones, or sensors of a passive sonar system), and using any one or more suitable estimation techniques (including any of those mentioned herein). The position-estimation technique may calculate the positions or spatial confidence intervals (or both), or they may be calculated or estimated separately.

After temporal and spatial confidence intervals are determined for the plural sonic events, the sonic events are ordered based on their temporal confidence intervals, and each pairing of two different sonic events of the set, using the ordering, is tested against a set of one or more preselected constraints. At least some of those constraints depend on the temporal and spatial confidence intervals. A given pairing of sonic events is classified as comparable only if that pairing meets the set of preselected constraints.

In some examples a maximum speed is specified for the sonic sources of the specified class (e.g., a maximum observed speed for a particular whale species, a maximum sailing speed of a particular class of ship, or a maximum airspeed for a particular class of aircraft). Many examples use a maximum speed constraint for classifying a given pair of events as comparable.

For a pair of sonic events to meet the so-called maximum speed constraint, a sonic source of the class, moving no faster than its maximum speed, must be able to have produced or generated both sonic events of that pair. If the spatial confidence intervals are too far apart spatially for a given temporal separation (or the sonic events are too close together temporally for given spatial separation), then that pair of sonic events is not comparable. In other words, for a non-comparable pair of sonic events, the sonic source could not have produced or generated the earlier sonic event within its corresponding temporal and spatial confidence intervals and then moved fast enough to be positioned within the later event's spatial confidence during its temporal confidence interval.

Expressing the maximum speed constraint more quantitatively, in some examples the set of one or more preselected constraints includes the constraint that, for each pairing classified as comparable, either (i) the corresponding spatial confidence intervals overlap or are statistically consistent with each other, or (ii) a minimum distance between the corresponding non-overlapping spatial confidence intervals, divided by a maximum time span encompassed by the corresponding temporal confidence intervals, is less than or equal to a preselected maximum speed of sonic sources of the specified class.

The maximum time span encompassed by a pair of temporal confidence intervals is defined as the maximum time span between the earlier bound of one temporal confidence interval of the pair and the later bound of the other. Thus, for non-overlapping or partly overlapping temporal confidence intervals, the encompassed time span extends from the earlier bound of the earlier interval to the later bound of the later interval.

Minimum distance between non-overlapping spatial confidence interval depends on their particular shapes and orientations; for circular or spherical confidence intervals, the minimum distance is the distance between the boundary surfaces along a line joining their respective centers.

Other suitable constraints can be employed.

In some examples, a minimum speed constraint might be applicable (in addition to or in lieu of the maximum speed constraint). For example, if a particular bird species were known to call only in flight, then a minimum flight speed can be applied. For another example, if a ship, vehicle, or aircraft is known to emit a particular sound or type of sound only while moving above a certain minimum speed, then a minimum speed constraint can be applied. Under such a constraint, a pair of sonic events would be non-comparable if they occurred too close to each other. Minimum speed constraints might depend on or be established in combination with turning radius, a different constraint discussed below, because of the possibility of the source producing or generating two sounds in nearby locations by circling back.

More quantitatively, in some examples the set of one or more preselected constraints includes the minimum speed constraint that, for each pairing classified as comparable, a maximum distance encompassed by the corresponding spatial confidence intervals, divided by a minimum time span encompassed by the corresponding temporal confidence intervals, is greater than or equal to a preselected minimum speed of sonic sources of the specified class. The maximum distance encompassed by a pair of spatial confidence intervals depends on their particular shapes and orientations; the minimum time span encompassed by a pair of temporal confidence intervals is defined as the minimum time span between the later bound of one temporal confidence interval of the pair and the earlier bound of the other.

Some classes of sonic sources might be limited in how soon after producing or generating one sonic event a second sonic event could be produced or generated by that source. For example, a whale species might be physically incapable of calling twice in quick succession or simply have behavioral characteristics such that scientists know that individuals of that species pause for at least a given time between calls for whatever reason. For another example, a shipboard or airborne weapon might require a reload or recharge cycle between firings.

If the plural sonic sources are limited in that way, then in some examples the set of one or more preselected constraints can further include, for each pairing classified as comparable, the separation-time constraint that a time span separating the corresponding temporal confidence intervals is greater than a preselected minimum time between sonic events for sonic sources of the specified class.

Some classes of sonic sources might be limited in their types of movement, e.g., by a maximum turning rate or minimum turning radius. For example, if a supertanker can only turn at a given rate, it may have a maximum speed that would seem to allow time for the ship to pass from point A to point B and then to point C, but if point C is spaced far from the line passing through points A and B, a slow turning rate of the ship might preclude it from arriving at point C even at maximum speed.

If the plural sonic sources are limited in that way, then in some examples the set of one or more preselected constraints can further include a turning-rate constraint, such that, for each pairing classified as comparable, a corresponding turning rate is less than a preselected maximum turning rate for sonic sources of the specified class (equivalently, a turning radius being larger than a preselected minimum turning radius).

Classification using a turning rate or turning radius constraint is more complicated than other examples described. Before applying that constraint, possible paths for the sonic sources are calculated (described further below), and those paths compared to the turning rate or turning radius constraint. Non-comparable pairs of sonic events are those for which no possible path between them satisfies the turning rate or turning radius constraint.

With the plural sonic events classified as comparable or non-comparable as described above, a minimum number of sonic sources that could have produced or generated the set of plural sonic events can be estimated.

In previous work by this inventor (the '506 patent incorporated above), a method was disclosed for estimating a lower bound for the minimum number of sonic sources that could have produced or generated the set of plural sonic events; in many instances, but not always, that method also yields the minimum number of sonic sources. Within a chronological ordering of the set of plural sonic events (i.e., treating the plural sonic events as a partially ordered set, often referred to as a poset), the number of sonic events in a longest antichain is determined by suitable techniques (as discussed further in the '506 patent). An antichain is defined as a subset of the sonic events for which no pairing of two different sonic events of that subset is a comparable pairing (i.e., no two sonic events of an antichain could have been produced or generated by the same sonic source). The length of the longest antichain (i.e., the number of sonic events in the longest antichain) is equal to, or at least sets a lower bound for, the minimum number of sonic sources that could have produced or generated the set of plural sonic events, applying Dilworth's theorem. See Dilworth, R. P., *A decomposition theorem for partially ordered sets*, Annals Math. 51(1), 161-66, http://www.jstor.org/stable/1969503, 10.1007/978-0-8176-4842-8 10 (1950) (minimum number of chains equals the number of elements of the largest antichain of a finite partially ordered set).

In the current work disclosed herein, a different methodology is employed that reliably yields the correct minimum number of sonic sources that could have produced or generated the set of sonic events. This correct minimum number is greater than or equal to the number of elements in the largest antichain. After creating the partially ordered set of sonic events, and classifying each pair of events within the set as either comparable or not (all as disclosed above), an equivalent bipartite graph is derived from the partially ordered set and the classification. Such an equivalent bipartite graph can be derived from the partially ordered set by any suitable method. One example is disclosed by Erickson (Erickson, Jeff; *Algorithms*; § 11.5; 2019; published online at archive.org/details/Algorithms-Jeff-Erickson) and embodied in the appended software code. The software code separates the pairings of sonic events into one or more disjoint subsets, wherein, for each of the subsets, no sonic event of a subset is comparable with any of the sonic events outside that subset and each sonic event of the subset is comparable with at least one other sonic event of the subset. A bipartite graph is derived from a disjoint subset, wherein each edge of the bipartite graph connects a first vertex representing a first sonic event of the disjoint subset to a second vertex representing a second sonic event of the disjoint subset according to the chronological ordering, which second sonic event of the disjoint subset is comparable with the first sonic event of the disjoint subset according to the classifying discussed above. Once the equivalent bipartite graph is derived from the partially ordered set of sonic events, then any suitable algorithm can be employed for computing a maximum matching and its cardinality. Suitable examples include, e.g., the Hoperoft-Karp-Karzanov algorithm (Gabow, Harold N.; *The Weighted Matching Approach to Maximum Cardinality Matching*; Fundamenta Informaticae, vol. 154, No. 1-4; Mar. 10, 2017), Hungarian algorithm (Kuhn, H. W.; *The Hungarian Method for the Assignment Problem*, Naval Research Logistics Quarterly; vol. 2, Issue 1-2; March 1955), Ford-Fulkerson algorithm (Cormen, Thomas H. et al.; Section 26.2: *The FordFulkerson method*; Introduction to Algorithms (Third Ed.), MIT Press; pp. 708-766; 2009), approximation algorithms (Dufoss, Fanny et al; *Approximation algorithms for maximum matchings in undirected graphs*; CSC 2018—SIAM Workshop on Combinatorial Scientific Computing, Bergen, Norway; pp. 56-65; June 2018; Duan, Ran and Pettie, Seth, *Linear-Time Approximation for Maximum Weight Matching*, J. ACM, 61,1, 23 pp, DOI:http://dx.doi.org/10.1145/2529989, 2014), and randomized algorithms (Mucha, Marcin and Sankowski, Piotr; *Maximum Matchings via Gaussian Elimination*; Proceedings of the 45th Annual IEEE Symposium on Foundations of Computer Science (FOCS'04), Rome, Italy; pp. 248-255; 2004). According to those references, a maximum matching is the maximum number of edges of the bipartite graph that do not share a common one of the vertices of the bipartite graph. Equivalent mathematical methods can be used to derive the size of the maximum matching (Duan and Pettie, 2014). The total number of sonic events in the set minus the cardinality of the maximum matching, summed for all of the disjoint subsets, yields the minimum number of different sonic sources needed to produce or generate the set of sonic events. Each of the publications noted above is incorporated by reference as if set forth herein in its entirety (including the entire *Algorithms* volume of Erickson).

In some instances it may be desirable to characterize the likelihood or robustness of the estimation of the minimum number of sonic sources, or to characterize the sensitivity of the estimate with respect to small changes in the confidence intervals or the preselected constraints. Accordingly, in some examples the method can further include repeating the classification of the sonic events as comparable or non-comparable, deriving the equivalent bipartite graph, and computing the cardinality of the maximum matching, using one or both of (i) one or more altered spatial or temporal confidence intervals or (ii) an altered set of one or more preselected constraints.

Instead of the deterministic constraints described above, in some examples those constraints or other suitable constraints can instead include one or more probability distributions characterizing behavior of the sonic sources (e.g., a distribution of maximum speeds of a particular species of whale, or a distribution of turning radii for marine vessels). In such examples, estimating the minimum number of sonic sources includes determining a probability distribution for the cardinality of the maximum matching of the equivalent bipartite graph.

In some examples that process typically would include repeated determinations using different constraints within and weighted by the corresponding distributions (e.g., using Monte Carlo techniques), computing a probability for each of the minimum number of sources over those repeated determinations, and establishing summary statistics, such as a mean, variance, or other specified confidence interval. Other suitable techniques can be employed.

The chronological ordering of the plural sonic events can be achieved in any suitable way. In some examples, the chronological ordering of the plural sonic events can be ordered according to one or more parameters described above as characterizing the temporal confidence intervals. In some examples the sonic events can be chronologically ordered according to one or more of (i) corresponding earlier bounds, (ii) corresponding later bounds, or (iii) corresponding centers of the corresponding temporal confidence intervals. In some examples the sonic events can be chronologically ordered according to one or more of (i) corresponding peaks, (ii) corresponding centroids, or (iii) corresponding first moments of the corresponding temporal confidence intervals, if one or more of those parameters are available.

In some instances the relative chronological order of a subset of the sonic events might be ambiguous (e.g., sharing the same earlier bound, the same later bound, or center). If the ordering cannot be determined based on one parameter, in some instances an additional parameter can be used to resolve the order. Instead, or in instances wherein no parameters unambiguously determine a relative chronological order, a relative ordering can be randomly or arbitrarily assigned in some examples. The selected order does not affect the determination of the cardinality of the maximum matching, and hence it does not affect the estimation of the smallest number of sonic sources that could have produced or generated the plural sonic events. However, the selected order could affect the path calculation.

In some examples the probability, statistical similarity, likelihood, or cost that two sonic events are comparable can be incorporated by assigning various different non-zero values to their comparability (sometimes referred to as weights). For example, it may be possible for two sonic events to be comparable but unlikely if, e.g., the distance and time interval between the two sonic events would require an animal to move at its maximum speed for a longer period of time than it would normally be expected to be able to maintain that speed. In such an instance, a relatively small comparability value, e.g., 0.05, could be assigned to that pair of events. A pair of events that would require the animal to move at only a small fraction of its maximum speed, or at a large fraction of its maximum speed but for only a short time, could be assigned a relatively larger comparability value, e.g., 0.95.

Various techniques for deriving the bipartite graph, or determining a maximum matching and its cardinality, utilize various ways of displaying the comparability data described above. Some examples include generating an adjacency matrix ordered according to the chronologically ordered set of the plural sonic events and including indicia denoting whether pairings of the plural sonic events are comparable. Indicia of the adjacency matrix typically include zero values indicating non-comparable pairings and non-zero values indicating comparable pairings. If all of the non-zero values are the same, the result can be referred to as a non-weighted adjacency matrix; if the non-zero values differ as described above, the result can be referred to as a weighted adjacency matrix. Various methods are available for calculating the cardinality of the maximum matching when the non-zero comparability values have a plurality of values (Duan and Pettie, 2014). The differing non-zero comparability values do not affect the estimate of the minimum number of sonic events; they can affect a calculation of estimated paths taken by the sonic sources (discussed further below). One of the maximum matchings can have weights that sum to a maximum value compared with other maximum matchings.

Figure 2:
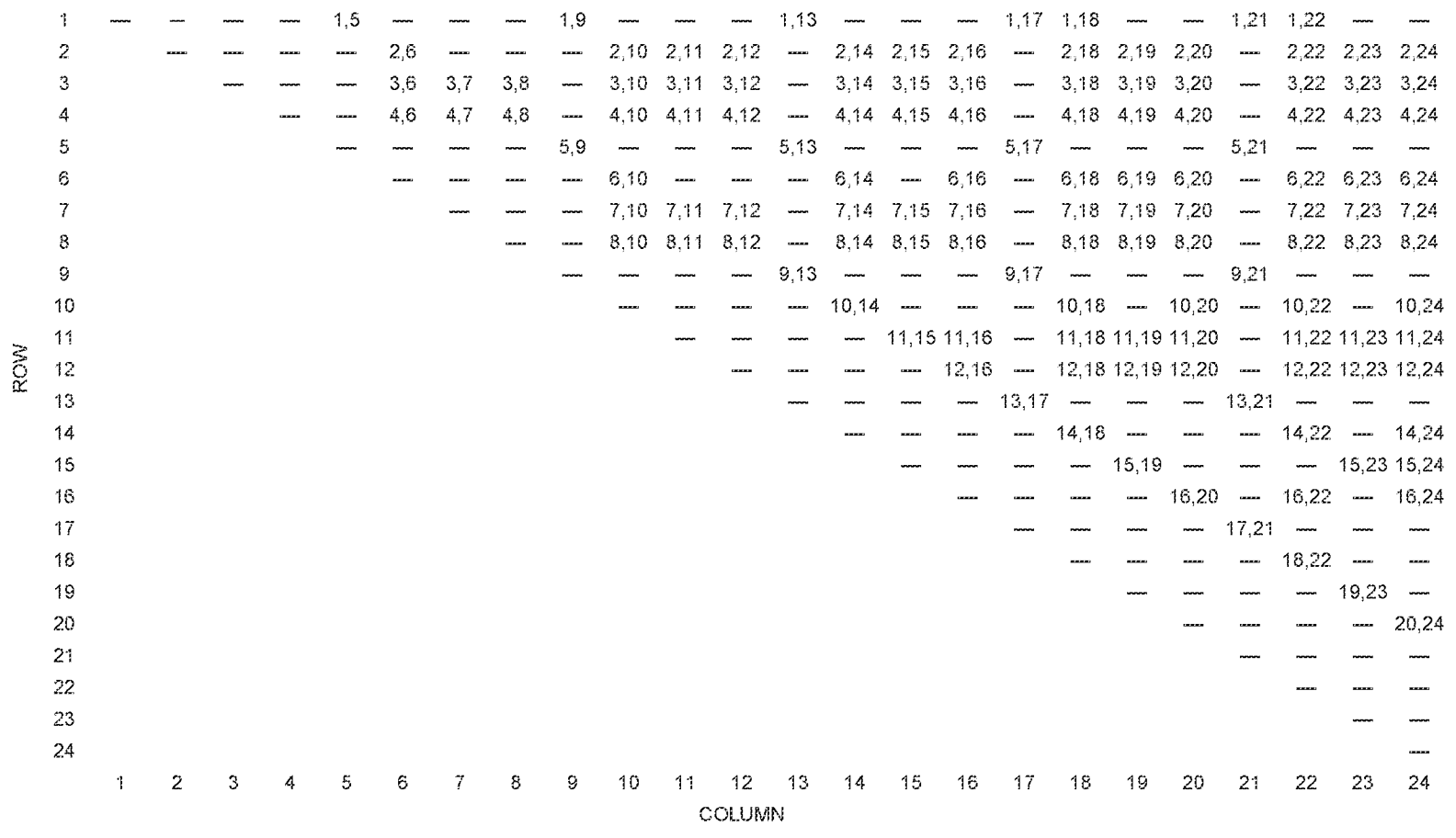

An example adjacency matrix for the sonic events listed in the table of FIG. 1 is shown in FIG. 2. The rows and columns of the adjacency matrix each refer to sonic events and are arranged in a selected chronological order as described above. The matrix elements above the diagonal are filled with comparability data for each pairing of sonic events. For comparable pairings, the corresponding matrix entries are non-zero (e.g., one); for non-comparable pairings, the corresponding matrix elements are zero. In FIG. 2, the zeroes appear as small dashes, and the non-zero elements are shown as indicators of the elements row and column numbers (for ease of understanding). For N sonic events, the number of matrix elements above the diagonal is $N(N-1)/2$; for 100 sonic events, for example, there are 4950 matrix elements. The equivalent bipartite graph can be derived from the adjacency matrix using any suitable technique (e.g., as in the reference of Erickson incorporated above). Software that can derive the equivalent bipartite graph and then compute a maximum matching and its cardinality from the above-described adjacency matrix is included in the software appendix included as part of the instant application.

The machines and methods disclosed herein can also be employed to find possible paths traversed by the minimum number of sonic sources to produce or generate the set of plural sonic events. In some examples, the inventive method can further comprise computing a set of distinct paths, with each of the paths denoting an estimated path for a corresponding one of the estimated minimum number of corresponding sonic sources. Any suitable computational technique can be employed for partitioning the plural sonic events into distinct paths. Various mathematically equivalent techniques for computing paths are known and can be used. Computing the possible paths can be performed using a maximum matching to partition the set of sonic events into a first set of mutually disjoint subsets, with each path corresponding to one of the disjoint subsets. In many examples, the set of paths that can be computed from a given maximum matching is not unique, and a second set of paths, different from the first, can be computed from the same maximum matching. In many examples the maximum matching is not unique, and any one of multiple maximum matchings, different from the first (but having the same cardinality), can be used to partition the set of sonic events into a second set of mutually disjoint subsets, different from the first, with each path corresponding to one of the disjoint subsets. In some examples in which differing comparability values are employed, a function of the corresponding weights of the comparable pairings that constitute each set of generated paths can be calculated. One of those generated sets of paths can be selected on the basis of a function of the weights of those paths (e.g., a sum of the weights), which can be indicative of corresponding probabilities, statistical similarities, likelihoods, or costs associated with the sets of generated paths.

Software to compute all of the possible maximum matchings is available, for example, from Chi Xu (Xu, Chi; EnumMatching; software download available at https://github.com/charlesxuuu/EnumMatching; May 2016) and Guangzhi Xu (Xu, Guangzhi; bipartite_matching; software download available at https://github.com/Xunius/bipartite_matching; June 2017). Different maximum matchings (equivalently, different possible sets of paths) also can be determined using a method disclosed by Takeaki (Takeaki, Uno; *Algorithms for Enumerating All Perfect, Maximum and Maximal Matchings in Bipartite Graphs*, ISAAC '97: Proceedings of the 8th International Symposium on Algorithms and Computation, http://dl.acm.org/citation.cfm?id=686418, p. 92-101, December 1997). The method of Takeaki can be implemented to yield all possible maximum matchings, each with its own corresponding set of paths. Software that can perform the calculations for enumerating all the maximum matchings is included in the software appendix included as part of the instant application.

In some examples, a function of the weights of each set of paths can be calculated and used to select among the sets of paths based on, e.g., probabilities, statistical similarities, likelihoods, or costs (as discussed above). Some examples of suitable functions can include, e.g., a smallest sum of weights for a single path among the paths of a set (e.g., on the basis of which the set of paths with the largest such smallest sum might be selected), or a smallest median weight for a single path among the paths of a set (e.g., on the basis of which the set of paths with the largest such smallest median might be selected). Other suitable functions of the weights, or one or more suitable criteria for selecting a set of paths based on such functions, can be employed.

FIG. 3 is a plot of the locations (without confidence intervals, for simplicity) of the sonic events listed in the table of FIG. 1 and for which the adjacency matrix of FIG. 2 was generated; the numbers displayed indicate the chronological order in which the sonic events occurred. The estimated minimum number of sonic sources that could have produced or generated those sonic events is four (determined, for example, by operating as described above on the adjacency matrix of FIG. 2).

Figure 4:
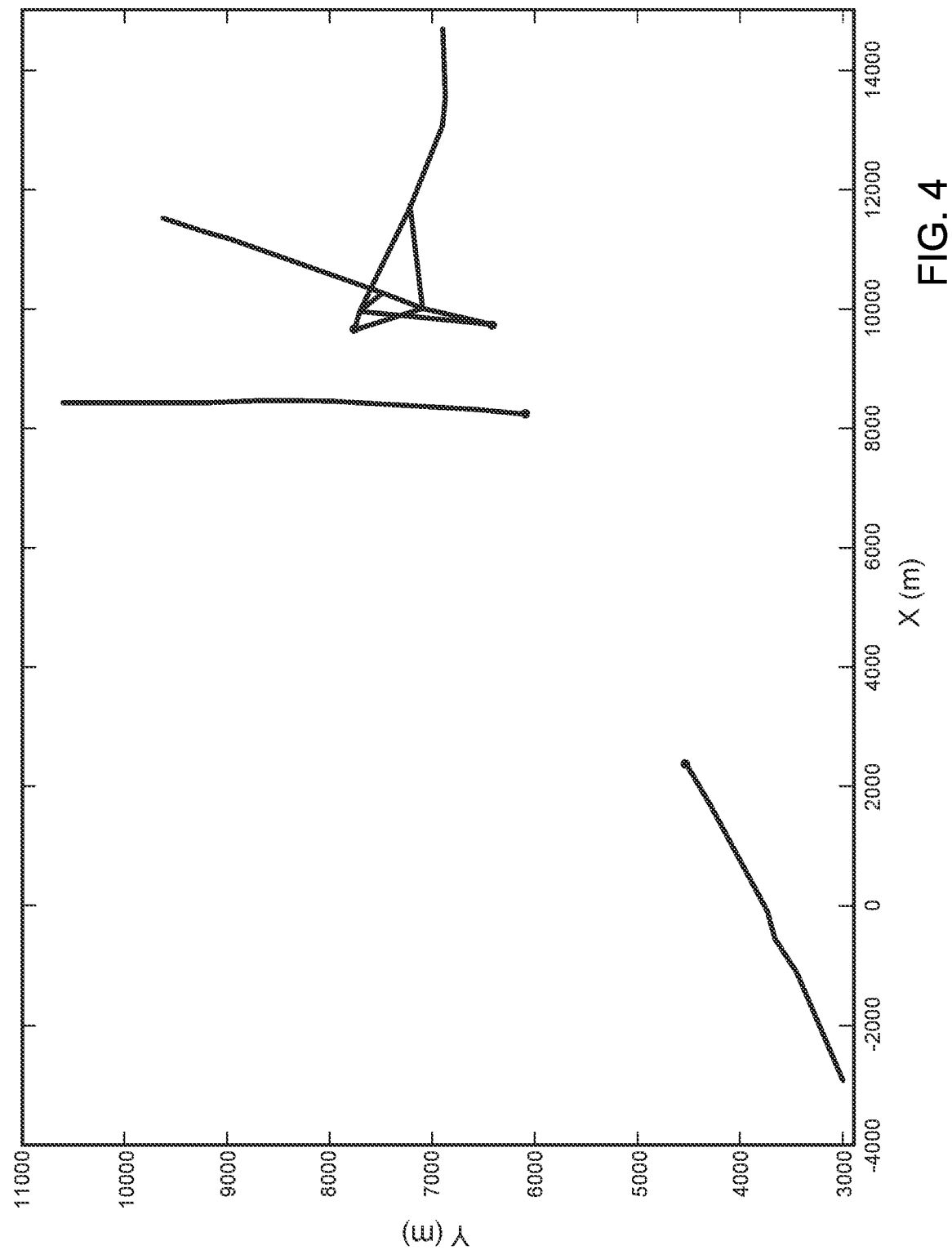
FIGS. 4-7 are spatial plots of multiple estimated paths of sonic sources calculated as capable of having produced or generated the sonic events listed in FIG. 1.

FIG. 4 is a plot of multiple possible paths of four moving sonic sources that could have produced or generated the 24 sonic events. For the two leftmost sources represented in FIG. 4, there is only one possible path for each source. For the two rightmost sources in FIG. 4, there are multiple possible paths for each source.

Figure 5:
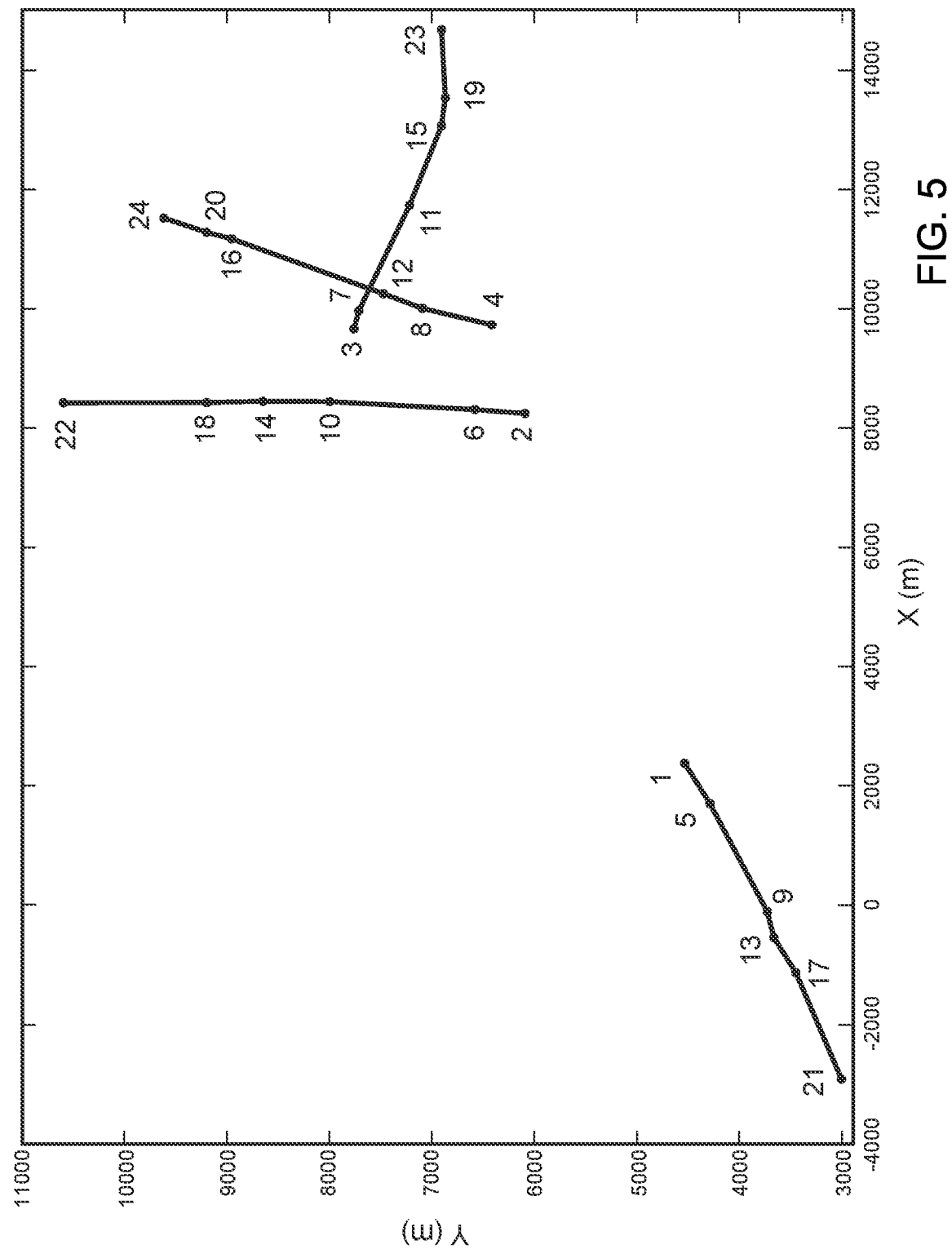
Figure 6:
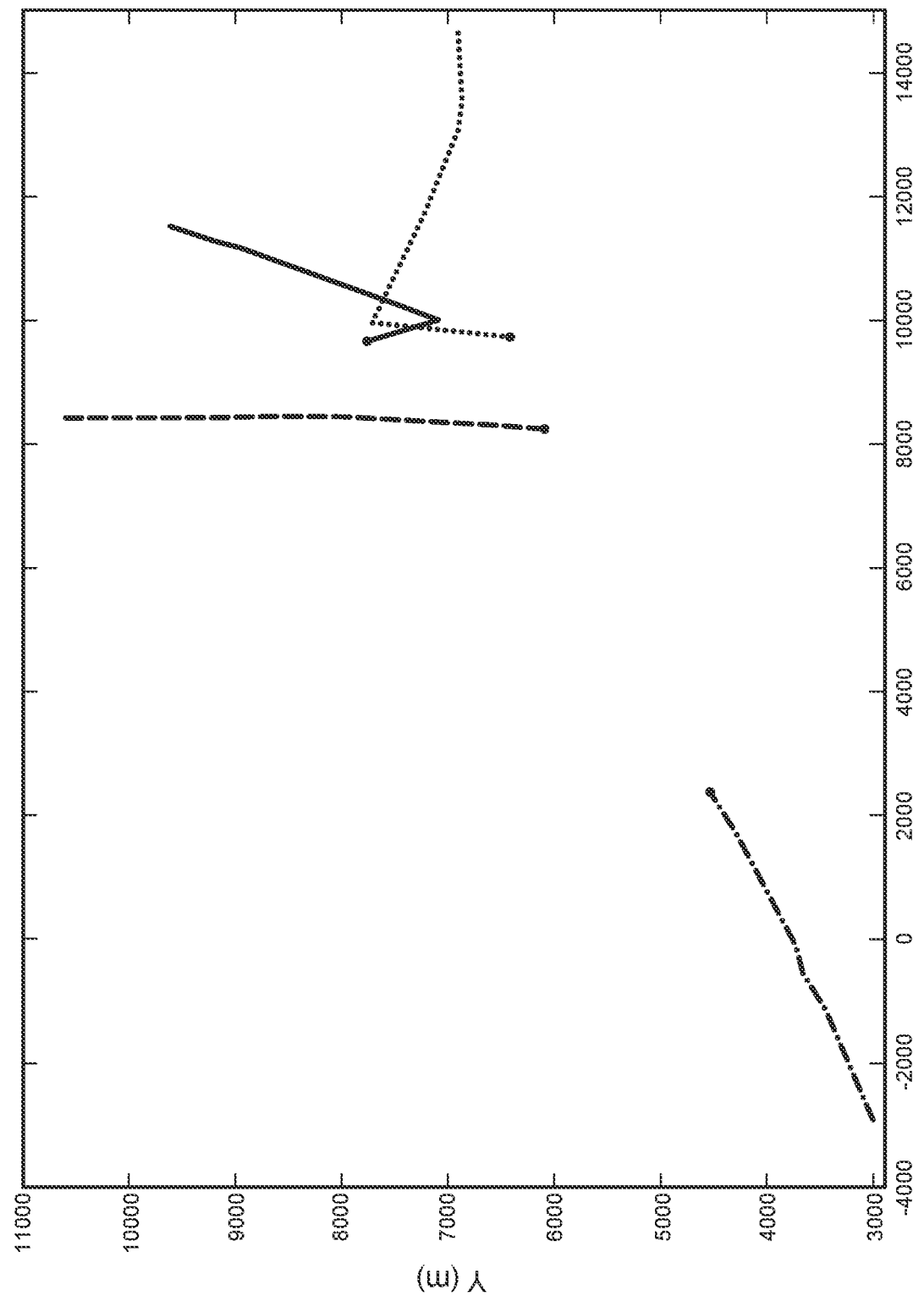
Figure 7:
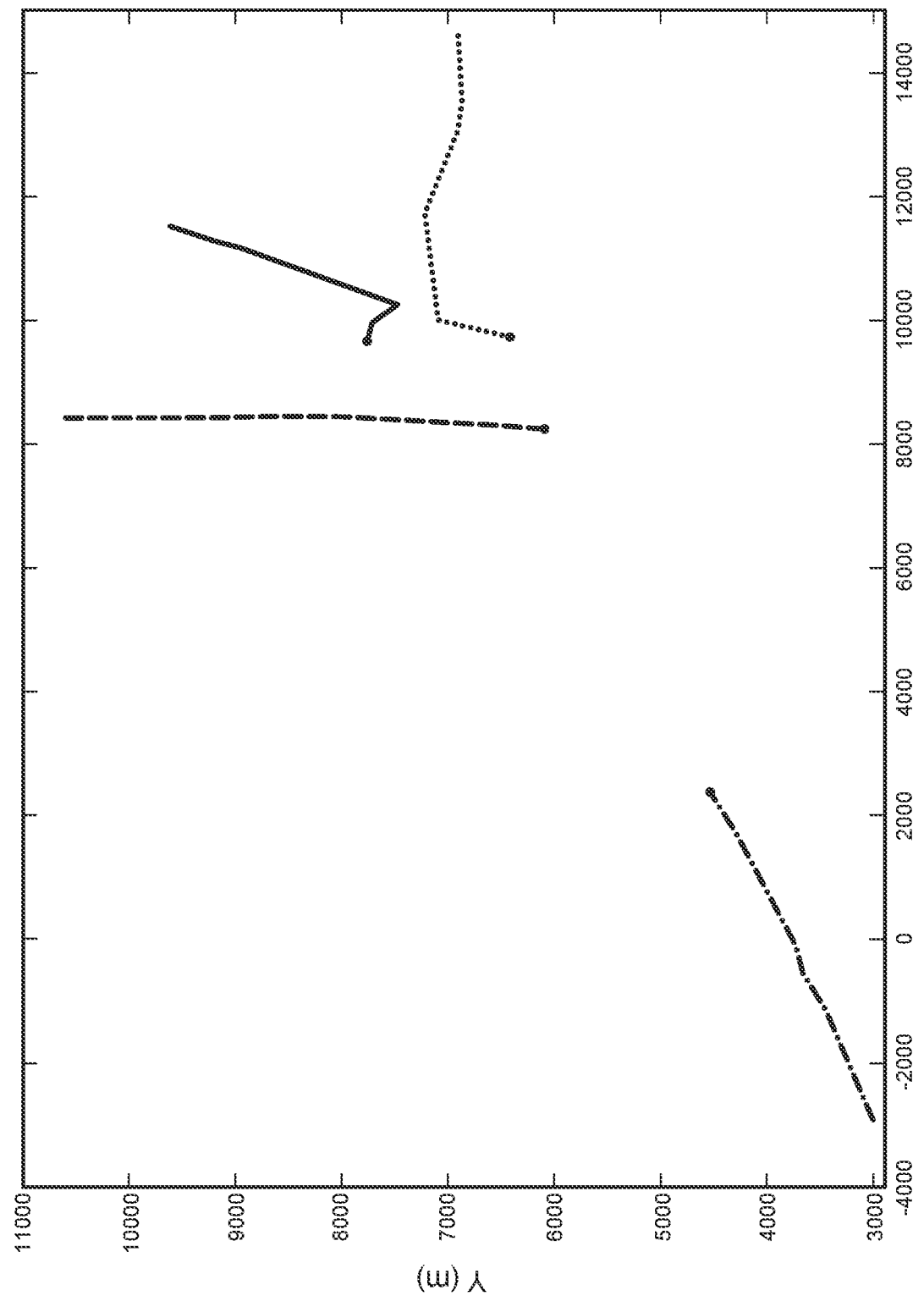

FIGS. 5, 6, and 7 show different possible chains for the four moving sonic sources (dots representing the estimated locations of the 24 sonic events shown in FIG. 5) that could have produced or generated the 24 sonic events as the moving sonic sources traversed those paths.

In some instances it may be desirable to characterize the robustness of the estimation of the multiple paths of sonic sources, or to characterize the sensitivity of the estimated paths with respect to small changes in the confidence intervals or the preselected constraints. Accordingly, in some examples the inventive method can further include repeating the calculation of the paths using one or both of (i) one or more altered spatial or temporal confidence intervals or (ii) an altered set of one or more preselected constraints.

The order of steps described above is not necessarily fixed; steps can be performed in any suitable order. Any combinations of the steps described above in combination with any selected calculation technique, for any one of the applications described herein, can be considered as an example taught by this disclosure.

A programmed computerized machine comprising one or more electronic processors and one or more tangible computer-readable storage media operationally coupled to the one or more processors can be structured and programmed to perform any of the inventive methods described above. An article comprising a tangible medium that is not a propagating signal can encode computer-readable instructions that, when applied to a computerized machine, program the computerized machine to perform any of the inventive methods described above.

Computer code for one example implementation is disclosed in an appendix that is part of this application. Incorporated by reference herein is a computer program listing appendix submitted concurrently on a compact disc (with one duplicate). Software being submitted was run on a Microway WhisperStation with a Linux, Ubuntu 18.04 operating system. Other software to run the software is python 3.6.9, python 2.7.17, MATLAB R2020a, networkx: 2.2 and 2.4, numpy: 1.16.0, matplotlib: 1.5.1 and 3.2.1, SciPy 0.17.0, gi: 3.26.1, openjdk 11.0.7 2020-04-14, OpenJDK Runtime Environment (build 11.0.7+10-post-Ubuntu-2ubuntu218.04), and OpenJDK 64-Bit Server VM (build 11.0.7+10-post-Ubuntu-2ubuntu218.04, mixed mode, sharing). The following are lists of files on the compact disc, with their dates of creation and their sizes in bytes.

The following is the list of software programs written by John Louis Spiesberger. These software programs are in jls_software/. The program, estimate_lower_bnd_animals_that_called.m, processes real data and is written to accept locations processed with Sequential Bound Estimation with 100% intervals of location. The listing shows file size in number of bytes, creation date, and program name. Files ending in .m are Matlab files. Programs are from sbe_2d_analytical/on Spiesberger's computer and are part of changeset 114. Listing is obtained with linux command: ls –l|awk '{print $5, $6, $7, $9}'.

| Size | Creation Date | File Name |
|---|---|---|
| 4040 | Jun. 24, 2021 | adjacency_matrix_from_speed_vals.m |
| 12497 | Jun. 24, 2021 | all_combinations_permute_subgroups.m |
| 3842 | Jun. 24, 2021 | ambiguous_call_order_disjoint_graph.m |
| 2421 | Jun. 25, 2021 | bin_numb_to_coord_2d.m |
| 459 | Jun. 25, 2021 | binnumb_to_row_col.m |
| 24398 | Jun. 24, 2021 | charles_xu_code_max_matchings.m |
| 802 | Jun. 25, 2021 | compl.m |
| 19985 | Jun. 24, 2021 | construct_chain_partitions_bipartite.m |
| 9937 | Jun. 24, 2021 | construct_chain_partitions_bipartite_sub1.m |
| 6713 | Jun. 24, 2021 | convert_vertex_numbs_in_e.m |
| 7324 | Jun. 25, 2021 | d_3d_two_bin_sets.m |
| 8760 | Jun. 24, 2021 | disjoint_graphs.m |
| 8895 | Jun. 24, 2021 | disjoint_path_covers.m |
| 8291 | Jun. 24, 2021 | disjoint_path_covers_connected_graph.m |
| 3260 | Jun. 24, 2021 | display_speed_matrix.m |
| 4556 | Jun. 24, 2021 | dist_bnds_2d_with_vert_uncertainty.m |
| 4421 | Jun. 24, 2021 | dist_bnds_rec_and_locs.m |
| 1504 | Jun. 25, 2021 | draw_boundaries_specified_bins_in_region.m |
| 875 | Jun. 25, 2021 | draw_region.m |
| 15421 | Jun. 24, 2021 | enumerate_call_time_orderings.m |
| 11011 | Jun. 24, 2021 | enumerate_chain_partition_time_ambiguity.m |
| 13408 | Jun. 24, 2021 | enumerate_tracks_time_ambiguity.m |
| 1287 | Jun. 25, 2021 | error_tabulate.m |
| 38572 | Jun. 24, 2021 | estimate_lower_bnd_animals_that_called.m |
| 23555 | Jun. 25, 2021 | exterior_region_dist_ang.m |
| 40821 | Jun. 25, 2021 | exterior_region_dist_ang_combine.m |
| 12193 | Jun. 25, 2021 | exterior_regions.m |
| 1824 | Jun. 24, 2021 | fill_specified_bins_translucent1.m |
| 1075 | Jun. 24, 2021 | fill_trace.m |
| 1995 | Jun. 25, 2021 | get_all_bin_vertices.m |
| 124 | Jun. 25, 2021 | get_all_max_matchings.pl |
| 1556 | Jun. 25, 2021 | get_bin_vertices.m |
| 3323 | Jun. 25, 2021 | get_call_time_bnds.m |
| 2086 | Jun. 24, 2021 | get_locs_in_time_win.m |
| 955 | Jun. 25, 2021 | intersect_intervals.m |
| 3250 | Jun. 25, 2021 | intersect_rectangle_a.m |
| 7684 | Jun. 24, 2021 | loc_format_convert1.m |
| 9219 | Jun. 24, 2021 | lower_bnd_animals_that_called.m |
| 1773 | Jun. 25, 2021 | make_debug_output.m |
| 597 | Jun. 24, 2021 | make_hasse_diagram.m |
| 1344 | Jun. 25, 2021 | matrix_transform1.m |
| 4202 | Jun. 25, 2021 | max_dist_bins.m |
| 1651 | Jun. 24, 2021 | mean_rec_locs.m |
| 3911 | Jun. 24, 2021 | merge_sorted_intervals.m |
| 4131 | Jun. 24, 2021 | min_dist_between_locs.m |
| 812 | Jun. 24, 2021 | new_numb_to_orig_numb.m |
| 9095 | Jun. 24, 2021 | number_orderings_each_subgroup.m |
| 7249 | Jun. 24, 2021 | orderings_intervals_in_group.m |
| 1690 | Jun. 25, 2021 | perms_ps.m |
| 2209 | Jun. 25, 2021 | permsr.m |
| 8268 | Jun. 24, 2021 | plt_hasse_realizations.m |
| 2252 | Jun. 24, 2021 | plt_limits_slideshow_sbe_locs.m |
| 3985 | Jun. 24, 2021 | plt_time_bnds_call_orders.m |
| 6881 | Jun. 24, 2021 | plt_track_realizations.m |
| 2832 | Jun. 24, 2021 | plt_true_loc_and_region1.m |
| 2781 | Jun. 24, 2021 | prepare_java_dir_run_BipartiteMatching_ps.m |
| 2382 | Jun. 25, 2021 | print_output.m |
| 1329 | Jun. 25, 2021 | program_name_to_program_number.m |
| 3093 | Jun. 24, 2021 | put_matfile_in_fields.m |
| 2490 | Jun. 24, 2021 | row_col_sym_to_linearm |
| 2339 | Jun. 24, 2021 | rows_cols_call_i_speed_matrix.m |
| 6972 | Jun. 24, 2021 | select_time_win_locs.m |
| 3754 | Jun. 24, 2021 | show_tracks.m |
| 2333 | Jun. 24, 2021 | signal_speed_bnds_from_sbe_2d_analytical_output.m |
| 5133 | Jun. 24, 2021 | slideshow_sbe_locs.m |
| 514 | Jun. 24, 2021 | sort_intervals_start_times.m |
| 5418 | Jun. 24, 2021 | speed_matrix_from_call_time_bounds.m |
| 3017 | Jun. 24, 2021 | summarize_ambig_time_ordering.m |
| 1095 | Jun. 24, 2021 | transform_matrix_specified_order.m |
| 7552 | Jun. 24, 2021 | transform_v_order.m |
| 9982 | Jun. 25, 2021 | two_d_dist_bounds_bins.m |
| 1443 | Jun. 25, 2021 | two_intervals_dist_bnds.m |
| 2263 | Jun. 24, 2021 | verticies_each_disjoint_graph.m |

The following public-domain software is located in enumerate_maximum_matchings/, and was obtained from github.com/charlesxuuu/EnumMatching, www.chixu.me May 31, 2016, EnumMatching (obtained from changeset 0 in ~/work/researchprojects/enumerate_maximum_matchings/). Files ending in .java are java programs; files ending in .class are executables. The listing shows file size in number of bytes, date, and program name. Listing obtained with linux command: ls –l|awk '{print $5, $6, $7, $9}'.

| Size | Creation Date | File Name |
|---|---|---|
| 5434 | Jun. 16, 2020 | AcyclicLP.java |
| 5222 | Jun. 16, 2020 | AcyclicSP.java |
| 5860 | Jun. 16, 2020 | AdjMatrixEdgeWeightedDigraph.java |
| 5125 | Jun. 16, 2020 | Alphabet.java |
| 2864 | Jun. 16, 2020 | Arbitrage.java |
| 6562 | Jun. 16, 2020 | AssignmentProblem.java |
| 1615 | Jun. 16, 2020 | Average.java |
| 11421 | Jun. 16, 2020 | BST.java |
| 6842 | Jun. 16, 2020 | BTree.java |
| 1036 | Jun. 16, 2020 | Bag$ListIterator.class |
| 427 | Jun. 16, 2020 | Bag$Node.class |
| 1913 | Jun. 16, 2020 | Bag.class |
| 3680 | Jun. 16, 2020 | Bag.java |
| 10840 | Jun. 16, 2020 | BelimanFordSP.java |
| 1293 | Jun. 16, 2020 | BinaryDump.java |
| 10804 | Jun. 16, 2020 | BinaryIn.java |
| 9446 | Jun. 16, 2020 | BinaryOut.java |
| 2766 | Jun. 16, 2020 | BinarySearch.java |
| 7164 | Jun. 16, 2020 | BinarySearchST.java |
| 9068 | Jun. 16, 2020 | BinaryStdIn.java |
| 8083 | Jun. 16, 2020 | BinaryStdOut.java |
| 6505 | Jun. 16, 2020 | Bipartite.java |
| 6848 | Jun. 16, 2020 | BipartiteMatching.class |
| 11750 | Jun. 16, 2020 | BipartiteMatching.java |
| 8013 | Jun. 16, 2020 | BipartiteMatching_jls.class |
| 17582 | Jun. 16, 2020 | BipartiteMatching_jls.java |
| 1770 | Jun. 16, 2020 | BlackFilter.java |
| 6693 | Jun. 16, 2020 | BoruvkaMST.java |
| 4272 | Jun. 16, 2020 | BoyerMoore.java |
| 5859 | Jun. 16, 2020 | BreadthFirstDirectedPaths.java |
| 8030 | Jun. 16, 2020 | BreadthFirstPaths.java |
| 5417 | Jun. 16, 2020 | CC.java |
| 3174 | Jun. 16, 2020 | CPM.java |
| 1614 | Jun. 16, 2020 | Cat.java |
| 5031 | Jun. 16, 2020 | ClosestPair.java |
| 7386 | Jun. 16, 2020 | CollisionSystem.java |
| 5216 | Jun. 16, 2020 | Complex.java |
| 1211 | Jun. 16, 2020 | Count.java |
| 2518 | Jun. 16, 2020 | Counter.java |
| 4734 | Jun. 16, 2020 | Cycle.java |
| 5874 | Jun. 16, 2020 | Date.java |

-continued

| Size | Creation Date | File Name |
|---|---|---|
| 1304 | Jun. 16, 2020 | DeDup.java |
| 4279 | Jun. 16, 2020 | DegreesOfSeparation.java |
| 2353 | Jun. 16, 2020 | DepthFirstDirectedPaths.class |
| 3987 | Jun. 16, 2020 | DepthFirstDirectedPaths.java |
| 3926 | Jun. 16, 2020 | DepthFirstOrder.class |
| 6957 | Jun. 16, 2020 | DepthFirstOrder.java |
| 3787 | Jun. 16, 2020 | DepthFirstPaths.java |
| 3206 | Jun. 16, 2020 | DepthFirstSearch.java |
| 3766 | Jun. 16, 2020 | Digraph.class |
| 6700 | Jun. 16, 2020 | Digraph.java |
| 15987 | Jun. 16, 2020 | DigraphGenerator.java |
| 3102 | Jun. 16, 2020 | DijkstraAllPairsSP.java |
| 8193 | Jun. 16, 2020 | DijkstraSP.java |
| 4768 | Jun. 16, 2020 | DirectedCycle.java |
| 2128 | Jun. 16, 2020 | DirectedDFS.class |
| 3886 | Jun. 16, 2020 | DirectedDFS.java |
| 1687 | Jun. 16, 2020 | DirectedEdge.class |
| 2758 | Jun. 16, 2020 | DirectedEdge.java |
| 2102 | Jun. 16, 2020 | DoublingRatio.java |
| 1892 | Jun. 16, 2020 | DoublingTest.java |
| 40717 | Jun. 16, 2020 | Draw.java |
| 221 | Jun. 16, 2020 | DrawListener.java |
| 3679 | Jun. 16, 2020 | Edge.java |
| 4021 | Jun. 16, 2020 | EdgeWeightedDigraph.class |
| 7873 | Jun. 16, 2020 | EdgeWeightedDigraph.java |
| 6273 | Jun. 16, 2020 | EdgeWeightedDirectedCycle.java |
| 8259 | Jun. 16, 2020 | EdgeWeightedGraph.java |
| 6254 | Jun. 16, 2020 | FFT.java |
| 3183 | Jun. 16, 2020 | FarthestPair.java |
| 1929 | Jun. 16, 2020 | FileIndex.java |
| 2500 | Jun. 16, 2020 | FlowEdge.class |
| 7583 | Jun. 16, 2020 | FlowEdge.java |
| 3554 | Jun. 16, 2020 | FlowNetwork.class |
| 6770 | Jun. 16, 2020 | FlowNetwork.java |
| 9429 | Jun. 16, 2020 | Floyd Warshall.java |
| 5266 | Jun. 16, 2020 | FordFulkerson.class |
| 9148 | Jun. 16, 2020 | FordFulkerson.java |
| 2869 | Jun. 16, 2020 | FrequencyCounter.java |
| 1015 | Jun. 16, 2020 | GREP.java |
| 5665 | Jun. 16, 2020 | GabowSCC.java |
| 2186 | Jun. 16, 2020 | GaussianElimination.java |
| 1570 | Jun. 16, 2020 | Genome.java |
| 3330 | Jun. 16, 2020 | GrahamScan.java |
| 6000 | Jun. 16, 2020 | Graph.java |
| 14260 | Jun. 16, 2020 | GraphGenerator.java |
| 3558 | Jun. 16, 2020 | Heap.java |
| 1467 | Jun. 16, 2020 | HexDump.java |
| 5699 | Jun. 16, 2020 | Huffman.java |
| 8612 | Jun. 16, 2020 | In.class |
| 17003 | Jun. 16, 2020 | In.java |
| 12259 | Jun. 16, 2020 | IndexMaxPQ.java |
| 12376 | Jun. 16, 2020 | IndexMinPQ.java |
| 5161 | Jun. 16, 2020 | Insertion.java |
| 3389 | Jun. 16, 2020 | InsertionX.java |
| 6266 | Jun. 16, 2020 | Interval1D.java |
| 3896 | Jun. 16, 2020 | Interval2D.java |
| 4147 | Jun. 16, 2020 | KMP.java |
| 2320 | Jun. 16, 2020 | KWIK.java |
| 2657 | Jun. 16, 2020 | Knuth.java |
| 2924 | Jun. 16, 2020 | KosarajuSharirSCC.class |
| 6697 | Jun. 16, 2020 | KosarajuSharirSCC.java |
| 6157 | Jun. 16, 2020 | KruskalMST.java |
| 1445 | Jun. 16, 2020 | LRS.java |
| 3536 | Jun. 16, 2020 | LSD.java |
| 2866 | Jun. 16, 2020 | LZW.java |
| 7092 | Jun. 16, 2020 | LazyPrimMST.java |
| 5227 | Jun. 16, 2020 | LinearProbingHashST.java |
| 5138 | Jun. 16, 2020 | LinearRegression.java |
| 3447 | Jun. 16, 2020 | LinkedBag.java |
| 6225 | Jun. 16, 2020 | LinkedQueue.java |
| 5549 | Jun. 16, 2020 | LinkedStack.java |
| 2212 | Jun. 16, 2020 | LongestCommonSubstring.java |
| 2427 | Jun. 16, 2020 | LookupCSV.java |
| 2234 | Jun. 16, 2020 | Lookupindex.java |
| 5714 | Jun. 16, 2020 | MSD.java |
| 8721 | Jun. 16, 2020 | MaxPQ.java |
| 6032 | Jun. 16, 2020 | Merge.java |
| 3836 | Jun. 16, 2020 | MergeBU.java |
| 4703 | Jun. 16, 2020 | MergeX.java |
| 8654 | Jun. 16, 2020 | MinPQ.java |
| 2429 | Jun. 16, 2020 | Multiway.java |
| 2551 | Jun. 16, 2020 | MyDepthFirstDirectedPaths.class |
| 2914 | Jun. 16, 2020 | MyDepthFirstDirectedPaths.java |
| 1582 | Jun. 16, 2020 | MyDigraph.class |
| 1196 | Jun. 16, 2020 | MyDigraph.java |
| 336 | Jun. 16, 2020 | MyFlowNetwork.class |
| 348 | Jun. 16, 2020 | MyFlowNetwork.java |
| 3638 | Jun. 16, 2020 | NFA.java |
| 5831 | Jun. 16, 2020 | Out.java |
| 4452 | Jun. 16, 2020 | Particle.java |
| 10209 | Jun. 16, 2020 | Picture.java |
| 1333 | Jun. 16, 2020 | PictureDump.java |
| 11084 | Jun. 16, 2020 | Point2D.java |
| 5562 | Jun. 16, 2020 | PolynomialRegression.java |
| 7171 | Jun. 16, 2020 | PrimMST.java |
| 1056 | Jun. 16, 2020 | Queue$ListIteratorclass |
| 437 | Jun. 16, 2020 | Queue$Node.class |
| 2806 | Jun. 16, 2020 | Queue.class |
| 5119 | Jun. 16, 2020 | Queue.java |
| 5419 | Jun. 16, 2020 | Quick.java |
| 3463 | Jun. 16, 2020 | Quick3string.java |
| 3791 | Jun. 16, 2020 | Quick3way.java |
| 3849 | Jun. 16, 2020 | QuickFindUF.java |
| 3903 | Jun. 16, 2020 | QuickUnionUF.java |
| 5080 | Jun. 16, 2020 | QuickX.java |
| 4155 | Jun. 16, 2020 | RabinKarp.java |
| 1942 | Jun. 16, 2020 | RandomSeq.java |
| 18796 | Jun. 16, 2020 | RedBlackBST.java |
| 3393 | Jun. 16, 2020 | ResizingArrayBag.java |
| 5324 | Jun. 16, 2020 | ResizingArrayQueue.java |
| 4868 | Jun. 16, 2020 | ResizingArrayStack.java |
| 1970 | Jun. 16, 2020 | RunLength.java |
| 9780 | Jun. 16, 2020 | SET.java |
| 7983 | Jun. 16, 2020 | ST.java |
| 4434 | Jun. 16, 2020 | Selection.java |
| 4147 | Jun. 16, 2020 | SeparateChainingHashST.java |
| 5934 | Jun. 16, 2020 | SequentialSearchST.java |
| 3861 | Jun. 16, 2020 | Shell.java |
| 10062 | Jun. 16, 2020 | Simplex.java |
| 3650 | Jun. 16, 2020 | SparseVector.java |
| 1056 | Jun. 16, 2020 | Stack$ListIteratorclass |
| 437 | Jun. 16, 2020 | Stack$Node.class |
| 2686 | Jun. 16, 2020 | Stack.class |
| 5172 | Jun. 16, 2020 | Stack.java |
| 2528 | Jun. 16, 2020 | StaticSETofInts.java |
| 6485 | Jun. 16, 2020 | StdArray10.java |
| 9466 | Jun. 16, 2020 | StdAudio.java |
| 42008 | Jun. 16, 2020 | StdDraw.java |
| 157753 | Jun. 16, 2020 | StdDraw3D.java |
| 5580 | Jun. 16, 2020 | StdIn.class |
| 13533 | Jun. 16, 2020 | StdIn.java |
| 13752 | Jun. 16, 2020 | StdInTestjava |
| 2804 | Jun. 16, 2020 | StdOut.class |
| 5694 | Jun. 16, 2020 | StdOut.java |
| 5585 | Jun. 16, 2020 | StdRandom.class |
| 12304 | Jun. 16, 2020 | StdRandom.java |
| 10580 | Jun. 16, 2020 | StdStats.java |
| 896 | Jun. 16, 2020 | Stopwatch.java |
| 1239 | Jun. 16, 2020 | StopwatchCPU.java |
| 7835 | Jun. 16, 2020 | SuffixArray.java |
| 9221 | Jun. 16, 2020 | SuffixArrayX.java |
| 4748 | Jun. 16, 2020 | SymbolDigraph.java |
| 5942 | Jun. 16, 2020 | SymbolGraph.java |
| 5689 | Jun. 16, 2020 | TST.java |
| 5334 | Jun. 16, 2020 | TarjanSCC.java |
| 213 | Jun. 16, 2020 | Test.java |
| 3338 | Jun. 16, 2020 | ThreeSum.java |
| 4036 | Jun. 16, 2020 | ThreeSumFast.java |
| 2523 | Jun. 16, 2020 | TopM.java |
| 3997 | Jun. 16, 2020 | Topological.java |
| 6654 | Jun. 16, 2020 | Transaction.java |
| 1308 | Jun. 16, 2020 | TransitiveClosure.class |
| 3611 | Jun. 16, 2020 | TransitiveClosure.java |
| 9176 | Jun. 16, 2020 | TrieSET.java |

-continued

| Size | Creation Date | File Name |
|---|---|---|
| 10224 | Jun. 16, 2020 | TrieST.java |
| 7644 | Jun. 16, 2020 | UF.java |
| 4294 | Jun. 16, 2020 | UnicodeTest.java |
| 6832 | Jun. 16, 2020 | Vector.java |
| 4349 | Jun. 16, 2020 | WeightedQuickUnionUF.java |
| 1764 | Jun. 16, 2020 | WhiteFilter.java |
| 1961 | Jun. 16, 2020 | Whitelist.java |
| 158 | Jun. 16, 2020 | make_java_executables |
| 5478 | Jun. 16, 2020 | testBipartiteMatching.java |
| 2829 | Jun. 16, 2020 | testGreedyPacking.java |

The following public-domain software is located in maximum_weight_bipartite_matching/, and was obtained from github.com/dgleich/gaimc/tree/master 33416fc on Aug. 23, 2015. The files are matlab files. The listing shows file size in number of bytes, date, and program name. Listing obtained with linux command: ls –l|awk '{print $5, $6, $7, $9}'.

| Size | Creation Date | File Name |
|---|---|---|
| 6580 | Jun. 24, 2020 | bipartite_matching.m |
| 2402 | Jun. 24, 2020 | code1.m |
| 1580 | Jun. 24, 2020 | csr_to_sparse.m |

The following input data files are located in data_files/ These are data files produced by Sequential Bound Estimation. They are inputs to estimate_lower_bnd_animals_that_called.m (below). Listing shows file size in number of bytes, date, and name of matlab data file. Listing obtained with linux command: ls –l|awk '{print $5, $6, $7, $9}'.

| Size | Creation Date | File Name |
|---|---|---|
| 12820688 | Jul. 6, 2020 | loc_metadata.mat |
| 14131168 | Jul. 6, 2020 | simulate_sbe_2d_analytical_mat_2.mat |

To run estimate_lower_bnd_animals_that_called.m using a real example dataset:

1) Create directory real_data_count/software.
2) Go to real_data_count/.
3) Copy the following two files from enumerate_maximum_matchings/ to real_data_count/.
Bipartitematching_jls.java*
get_all_max_matchings.pl
4) Put the following two binary files from data_files/ (above) in real_data_count/. They are both matlab mat files.
loc_metadata.mat (bearded seal calls in Arctic using run1110115, 5, 6, 8)
run output in real_data_count/locate/locate_10oct/simulate_sbe_2d_analytical_mat_2.mat (output of SBE for loc_metadata.mat above)
5) Start matlab in real_data_count/
6) Type the following commands in the Matlab command window:
addpath . . . /jls_software
addpath . . . /enumerate_maximum_matchings
7) Enter the following in the matlab command window:
invars.seed_start=1;
invars.vmax=10;
invars.showplots=1;
invars.Cbinsi=[0 0 0];
invars.max_cases_plt=4;
invars.plurality_case=1;
invars.n_max_display=20;
invars.dirnam='./';
invars.fnam_locout=['./ simulate_sbe_2d_analytical_mat_2.mat'];
invars.tstart=[2011 10 10 13 13 0];
invars.tend=[2011 10 10 13 20 0];
invars.z_bnds_all=[−40 0];
invars.method_enum_max_matchings=1;
invars.run_params_java.max_cases=[ ];
invars.run_params_java.max_elapsed_s=[ ];
invars.run_params_java.dir_java='run_java';
invars.max_call_time_orderings=1000;
invars.max_tracks_per_disjoint_graph=100;
invars.received_sig_start_time_unc=0.1;
invars.debugchk=0;
8) Run main program by typing the following in the matlab command window: [outvars,ierr]=estimate_lower_bnd_animals_that_called(invars);
9) Comments in the software code are self-documenting.

To run code1.m (which implements maximum weight bipartite matching):

1) Create directory called mwbm/at same level as jls_software/and maximum_weight_bipartite_matching/.
2) Start matlab in mwbm/.
3) type the following in the matlab command window:
addpath . . . /jls_software
addpath . . . /maximum_weight_bipartite_matching
4) Type the following in the matlab command window: code1.

Disclosed methods can be programmed in computer code as a set of computer instructions. Even if programmed on a general-purpose computer, such a computer should be considered non-generic and special-purpose once adapted because of the presence of specific programmed computer instructions, which control at least one computer processor and cause it to perform the functions described herein. Alternative instantiations can be accomplished equivalently with dedicated special-purpose computers or dedicated computer appliances, rather than program-adapted general-purpose computing machines. Either way, the specially programmed or structured computer comprises an improved computing machine that accomplishes functions not possible with computers not so constructed or adapted.

The disclosure focuses on a method or process, but the disclosure should be understood to refer equally to equipment or apparatus, such as a computer, that implements such methods or processes, as well as to computer instructions stored in tangible media that control a computer to implement such methods or processes.

Computer instructions (e.g., computer software, if used in lieu of hardware-wired machines), can be stored in any tangible, non-transient, temporary or permanent computer memory, digital storage, or replaceable media accessible to the computer or encoded in computer hardware, such as by including programming in microcode, machine code, network-based or web-based or distributed software modules that operate together, RAM, ROM, CD-ROM, CD-ft CD-R/W, DVD-ROM, DVD±R, DVD±R/W, hard drives, thumb drives, flash memory, optical media, magnetic media, semiconductor media, or any future computer-readable storage alternatives. The data on which the examples operate can be stored in the same or a different computer memory, storage, or media accessible to the computer, of any one or more of the types listed above.

References to "a computer" or "computer" (or simply references to computer-programmed operations, computations, or calculations) should be understood to allow for implementation on either a single computer or on multiple computers, such as a system of interconnected devices, or a set of devices using distributed processing techniques. Each computer device, also, may utilize one or more processors.

The word "step" is intended to refer to computer operations or acts, or phases, in the case of a method, or computer equipment programmed to perform such operations or acts, in the case of an apparatus. The word is not intended as having any special legal meaning.

The disclosure here focuses on a method or process, but the disclosure should be understood to refer equally to equipment or apparatus, such as a computer, that implements such methods or processes, as well as to computer instructions stored in tangible media (that is not a transitory propagating signal) that control a computer to implement such methods or processes.

In addition to the preceding examples, the following examples fall within the scope of the present disclosure:

Example 1. A method implemented using a programmed computerized machine, the method comprising: (a) for each one of a set of sonic events, the sonic events of the set arising from an unknown number of sonic sources of a specified class of sonic sources, one or more of which sonic sources are in motion with respect to at least one receiver, using the machine, determining a corresponding temporal confidence interval for a corresponding event time and a corresponding spatial confidence interval for a corresponding event position; (b) for each pairing of two different sonic events of the set, using the machine, classifying that pairing as comparable only when that pairing meets a set of one or more preselected constraints, at least some of which constraints depend on the temporal confidence intervals and the spatial confidence intervals; and (c) using the machine, estimating a minimum number of sonic sources that could have produced or generated the set of sonic events by equating the estimated minimum number of sonic sources to the total number of sonic events minus the cardinality of a maximum matching of a bipartite graph derived from a chronological ordering of the set of sonic events.

Example 2. The method of Example 1 further comprising creating the chronological ordering of the sonic events by ordering the sonic events according to one or more parameters selected from: (i) corresponding earlier bounds of the corresponding temporal confidence intervals, (ii) corresponding later bounds of the corresponding temporal confidence intervals, (iii) corresponding centers of the corresponding temporal confidence intervals, (iv) peak position of a probability distribution, (v) centroid of a probability distribution, or (vi) first moment of a probability distribution.

Example 3. The method of any one of Examples 1 or 2 further comprising creating at least a portion of the chronological ordering by randomly or arbitrarily selecting relative chronological order among one or more sonic events for which ordering according to the corresponding temporal confidence intervals is indeterminate.

Example 4. The method of any one of Examples 1 through 3 wherein the set of one or more preselected constraints includes the constraint that, for each pairing classified as comparable, either (i) the corresponding spatial confidence intervals overlap, or (ii) a minimum distance between the corresponding non-overlapping spatial confidence intervals, divided by a maximum time span encompassed by the corresponding temporal confidence intervals, is less than or equal to a preselected maximum speed of sonic sources of the specified class.

Example 5. The method of Example 4 wherein the set of one or more preselected constraints further includes, for each pairing classified as comparable, one or more of (i) a maximum distance encompassed by the corresponding spatial confidence intervals, divided by a minimum time span encompassed by the corresponding temporal confidence intervals, is greater than or equal to a preselected minimum speed of sonic sources of the specified class, (ii) a time span separating the corresponding temporal confidence intervals being greater than a preselected minimum time between sonic events for sonic sources of the specified class, or (iii) a corresponding turning rate being less than a preselected maximum turning rate for sonic sources of the specified class.

Example 6. The method of any one of Examples 1 through 5 wherein (i) the set of one or more preselected constraints includes one or more probability distributions characterizing behavior of the sonic sources, and (ii) estimating the minimum number of sonic sources includes determining a probability distribution for the minimum number of sonic sources.

Example 7. The method of any one of Examples 1 through 6 wherein the method further comprises repeating parts (a) through (c) using one or both of (i) one or more altered spatial or temporal confidence intervals or (ii) an altered set of one or more preselected constraints.

Example 8. The method of any one of Examples 1 through 7 wherein deriving the bipartite graph includes generating an adjacency matrix ordered according to the chronologically ordered set of the sonic events and including indicia denoting whether pairings of the sonic events are comparable.

Example 9. The method of any one of Examples 1 through 8 further comprising generating a first set of distinct paths, each path of the first set denoting an estimated path for one of the estimated minimum number of corresponding sonic sources that, together with the other sonic sources of the estimated minimum number of the sonic sources, could have produced or generated the set of sonic events, by partitioning the set of sonic events into a first set of mutually disjoint subsets using the maximum matching, each path corresponding to one of the disjoint subsets, wherein every pairing of two different sonic events of a given path of the first set is classified as comparable.

Example 10. The method of Example 9 further comprising generating a second set of distinct paths, each path of the second set denoting an estimated path for one of the estimated minimum number of corresponding sonic sources that, together with the other sonic sources of the estimated minimum number of the sonic sources, could have produced or generated the set of sonic events, by partitioning the set of sonic events into a second set of mutually disjoint subsets, different from the first set of disjoint subsets, using a different maximum matching, each path corresponding to one of the disjoint subsets, wherein every pairing of two different sonic events of a given path of the second set is classified as comparable.

Example 11. The method of any one of Examples 9 or 10, the method further comprising: (i) for each comparable pairing of sonic events of the set, calculating a non-zero numerical weight indicating a probability, statistical similarity, likelihood, or cost that the corresponding pairing of sonic events is comparable; (ii) for each set of generated paths, calculating a function of the corresponding weights of the comparable pairings that constitute the paths of that set; and (iii) selecting one of the sets of generated paths based on the calculated function.

Example 12. The method of any one of Examples 9 through 11 wherein the method further comprises repeating the generation of one or both of the first or second sets of distinct paths using one or both of (i) one or more altered spatial or temporal confidence intervals or (ii) an altered set of one or more preselected constraints.

Example 13. The method of any one of Examples 1 through 12 wherein the specified class of sonic sources includes one or more specified species of animal, and the sonic events are intermittently received calls of animals of the one or more specified species.

Example 14. The method of Example 13 wherein the specified class of sonic sources includes one or more specified species of marine or aquatic animals or one or more specified species of terrestrial animals.

Example 15. The method of Example 14 wherein the specified class of sonic sources includes one or more specified species of marine mammal.

Example 16. The method of Example 14 wherein the specified class of sonic sources includes only a single specified species of whale.

Example 17. The method of any one of Examples 1 through 12 wherein the specified class of sonic sources includes one or more specified types of marine or aquatic vessel, and the sonic events comprise a specified type of sound intermittently received from the specified vessels.

Example 18. The method of any one of Examples 1 through 12 wherein the specified class of sonic sources includes one or more specified types of land vehicle, and the sonic events comprise a specified type of sound intermittently received from the specified vehicles.

Example 19. The method of any one of Examples 1 through 12 wherein the specified class of sonic sources includes one or more specified types of aircraft, and the sonic events comprise a specified type of sound intermittently received from the specified aircraft.

Example 20. The method of any one of Examples 1 through 12 wherein the specified class of sonic sources includes one or more specified types of land-based, shipboard, or airborne weaponry, and the sonic events comprise a specified type of sound intermittently received from the specified weaponry.

Example 21. The method of any one of Examples 1 through 20 wherein part (a) comprises, for each one of a set of sonic events, using the machine, determining a corresponding temporal confidence interval for a corresponding event time and a corresponding spatial confidence interval for a corresponding event position using only data that are indicative of reception of sonic signals originating from the sonic sources.

Example 22. A programmed computerized machine comprising one or more electronic processors and one or more tangible computer-readable storage media operationally coupled to the one or more processors, the machine being structured and programmed to perform the method of any one of Examples 1 through 21.

Example 23. An article comprising a tangible medium that is not a propagating signal encoding computer-readable instructions that, when applied to a computerized machine, program the computerized machine to perform the method of any one of Examples 1 through 21.

It is intended that equivalents of the disclosed example apparatus and methods shall fall within the scope of the present disclosure. It is intended that the disclosed example apparatus and methods, and equivalents thereof, may be modified.

The examples described herein group various features (including method steps or acts) together for the purpose of streamlining the disclosure. This method of disclosure is not to be interpreted as reflecting an intention that any particular example requires each and every feature recited. Nor is the term "example" intended to refer to a necessary combination of features. The term "example" is not intended to reflect exclusion of features discussed in connection with different examples or with no specific example at all. Nor is any feature to be considered "essential" or "necessary" to any particular or all examples, unless explicitly stated.

Rather, it is contemplated that any particular feature or group of features discussed herein can be isolated from other features, even if disclosed in connection with a particular "example" having additional features. In addition, a feature or group of features from one example can be combined with features discussed elsewhere (unless clearly and necessarily inconsistent). The present disclosure shall be understood, therefore, as disclosing any example having any suitable set of one or more features (i.e., a set of features that are neither incompatible nor mutually exclusive) that appear in (including via incorporation) the present disclosure, including combinations of features that may not be explicitly disclosed in a particular example combination.

For purposes of this disclosure, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of this disclosure, words "comprising," "including," "having," and variants thereof, wherever they appear, shall be construed as open-ended terminology, with the same meaning as if the phrase "at least" were appended after each instance thereof.

Any labelling of elements, steps, limitations, or other portions (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited (unless an order is implicitly or inherently required by virtue of an explicitly recited sequence, such as one stated feature explicitly depending on an earlier one).

The Abstract is provided as required as an aid to those searching for specific subject matter within the patent literature. However, the Abstract is not intended to imply that any elements, features, or limitations recited therein are necessary.

What is claimed is:

1. A method implemented using a programmed computerized machine, the method comprising:
    (a) for each one of a set of sonic events, the sonic events of the set arising from an unknown number of sonic sources of a specified class of sonic sources, one or more of which sonic sources are in motion with respect to at least one receiver, using the machine, determining a temporal confidence interval corresponding to the sonic event and a spatial confidence interval corresponding to the sonic event;
    (b) using the machine, chronologically ordering sonic events of the set of sonic events according to the temporal confidence intervals of part (a);

(c) for each pairing of two different sonic events of the set arranged in the chronological order of part (b), using the machine, classifying that pairing as comparable only when that pairing meets a set of one or more preselected constraints, at least some of which constraints depend on the temporal confidence intervals and the spatial confidence intervals;

(d) using the machine, separating the pairings of sonic events into one or more disjoint subsets, wherein, for each of the subsets, no sonic event of a subset is comparable with any of the sonic events outside that subset and each sonic event of the subset is comparable with at least one other sonic event of the subset;

(e) using the machine, for each of the disjoint subsets, calculating the number of sonic events minus the cardinality of a maximum matching of a bipartite graph, wherein:
  (i) each edge of the bipartite graph connects a first vertex representing a first sonic event of the disjoint subset to a second vertex representing a second sonic event of the disjoint subset according to the chronological order of part (b), which second sonic event of the disjoint subset is comparable with the first sonic event of the disjoint subset according to the classifying in part (c); and
  (ii) the maximum matching is the maximum number of edges of the bipartite graph that do not share a common one of the vertices of the bipartite graph; and (f) using the machine, estimating a minimum number of sonic sources that could have produced or generated the set of sonic events by equating the estimated minimum number of sonic sources to the sum of the calculated numbers in part (e) for all of the disjoint subsets.

2. The method of claim 1 further comprising creating at least a portion of the chronological ordering by randomly or arbitrarily selecting relative chronological order among one or more sonic events for which ordering according to the corresponding temporal confidence intervals is indeterminate.

3. The method of claim 1 wherein the set of one or more preselected constraints includes the constraint that, for each pairing classified as comparable, either (i) the corresponding spatial confidence intervals overlap, or (ii) a minimum distance between the corresponding non-overlapping spatial confidence intervals, divided by a maximum time span encompassed by the corresponding temporal confidence intervals, is less than or equal to a preselected maximum speed of sonic sources of the specified class.

4. The method of claim 3 wherein the set of one or more preselected constraints further includes, for each pairing classified as comparable, one or more of (i) a maximum distance encompassed by the corresponding spatial confidence intervals, divided by a minimum time span encompassed by the corresponding temporal confidence intervals, is greater than or equal to a preselected minimum speed of sonic sources of the specified class, (ii) a time span separating the corresponding temporal confidence intervals being greater than a preselected minimum time between sonic events for sonic sources of the specified class, or (iii) a corresponding turning rate being less than a preselected maximum turning rate for sonic sources of the specified class.

5. The method of claim 1 wherein (i) the set of one or more preselected constraints includes one or more probability distributions characterizing behavior of the sonic sources, and (ii) estimating the minimum number of sonic sources includes determining a probability distribution for the minimum number of sonic sources.

6. The method of claim 1 wherein deriving the bipartite graph includes generating an adjacency matrix ordered according to the chronologically ordered set of the sonic events and including indicia denoting whether pairings of the sonic events are comparable.

7. The method of claim 1 further comprising generating a first set of distinct paths, each of the paths denoting an estimated path for one of the estimated minimum number of corresponding sonic sources that, together with the other sonic sources of the estimated minimum number of the sonic sources, could have produced or generated the set of sonic events, by partitioning the set of sonic events into a first set of mutually disjoint subsets using the maximum matching, each path corresponding to one of the disjoint subsets, wherein every pairing of two different sonic events of a given path of the first set is classified as comparable.

8. The method of claim 7 further comprising generating a second set of distinct paths, each of the paths denoting an estimated path for one of the estimated minimum number of corresponding sonic sources that, together with the other sonic sources of the estimated minimum number of the sonic sources, could have produced or generated the set of sonic events, by partitioning the set of sonic events into a second set of mutually disjoint subsets, different from the first set of disjoint subsets, using a different maximum matching, each path corresponding to one of the disjoint subsets, wherein every pairing of two different sonic events of a given path of the second set is classified as comparable.

9. The method of claim 8 further comprising:
  (i) for each comparable pairing of sonic events of the set, calculating a non-zero numerical weight indicating a probability, statistical similarity, likelihood, or cost that the corresponding pairing of sonic events is comparable;
  (ii) for each set of generated paths, calculating a function of the corresponding weights of the comparable pairings that constitute the paths of that set; and
  (iii) selecting one of the sets of generated paths based on the calculated function.

10. The method of claim 1 wherein the specified class of sonic sources includes one or more specified species of animal, and the sonic events are intermittently received calls of animals of the one or more specified species.

11. The method of claim 10 wherein the specified class of sonic sources includes one or more specified species of marine or aquatic animals or one or more specified species of terrestrial animals.

12. The method of claim 11 wherein the specified class of sonic sources includes only a single specified species of whale.

13. The method of claim 1 wherein the specified class of sonic sources (i) includes one or more specified types of marine or aquatic vessel, and the sonic events comprise a specified type of sound intermittently received from the specified vessels, (ii) includes one or more specified types of land vehicle, and the sonic events comprise a specified type of sound intermittently received from the specified vehicles, (iii) includes one or more specified types of aircraft, and the sonic events comprise a specified type of sound intermittently received from the specified aircraft, or (iv) includes one or more specified types of land-based, shipboard, or airborne weaponry, and the sonic events comprise a specified type of sound intermittently received from the specified weaponry.

14. The method of claim 1 wherein part (a) comprises, for each one of a set of sonic events, using the machine, determining a temporal confidence interval corresponding to the sonic event and a spatial confidence interval corresponding to the sonic event using only data that are indicative of reception of sonic signals originating from the sonic sources.

15. A programmed computerized machine comprising one or more electronic processors and one or more tangible computer-readable storage media operationally coupled to the one or more processors, the machine being structured and programmed to perform a method comprising:
  (a) for each one of a set of sonic events, the sonic events of the set arising from an unknown number of sonic sources of a specified class of sonic sources, one or more of which sonic sources are in motion with respect to at least one receiver, determining a temporal confidence interval corresponding to the sonic event and a spatial confidence interval corresponding to the sonic event;
  (b) using the machine, chronologically ordering sonic events of the set of sonic events according to the temporal confidence intervals of part (a);
  (c) for each pairing of two different sonic events of the set arranged in the chronological order of part (b), classifying that pairing as comparable only when that pairing meets a set of one or more preselected constraints, at least some of which constraints depend on the temporal confidence intervals and the spatial confidence intervals;
  (d) using the machine, separating the pairings of sonic events into one or more disjoint subsets, wherein, for each of the subsets, no sonic event of a subset is comparable with any of the sonic events outside that subset and each sonic event of the subset is comparable with at least one other sonic event of the subset;
  (e) using the machine, for each of the disjoint subsets, calculating the number of sonic events minus the cardinality of a maximum matching of a bipartite graph, wherein:
    (i) each edge of the bipartite graph connects a first vertex representing a first sonic event of the disjoint subset to a second vertex representing a second sonic event of the disjoint subset according to the chronological order of part (b), which second sonic event of the disjoint subset is comparable with the first sonic event of the disjoint subset according to the classifying in part (c); and
    (ii) the maximum matching is the maximum number of edges of the bipartite graph that do not share a common one of the vertices of the bipartite graph; and
  (f) using the machine, estimating a minimum number of sonic sources that could have produced or generated the set of sonic events by equating the estimated minimum number of sonic sources to the sum of the calculated numbers in part (e) for all of the disjoint subsets.

16. The machine of claim 15 wherein the set of one or more preselected constraints includes the constraint that, for each pairing classified as comparable, either (i) the corresponding spatial confidence intervals overlap, or (ii) a minimum distance between the corresponding non-overlapping spatial confidence intervals, divided by a maximum time span encompassed by the corresponding temporal confidence intervals, is less than or equal to a preselected maximum speed of sonic sources of the specified class.

17. The machine of claim 16 wherein the set of one or more preselected constraints further includes, for each pairing classified as comparable, one or more of (i) a maximum distance encompassed by the corresponding spatial confidence intervals, divided by a minimum time span encompassed by the corresponding temporal confidence intervals, is greater than or equal to a preselected minimum speed of sonic sources of the specified class, (ii) a time span separating the corresponding temporal confidence intervals being greater than a preselected minimum time between sonic events for sonic sources of the specified class, or (iii) a corresponding turning rate being less than a preselected maximum turning rate for sonic sources of the specified class.

18. The machine of claim 15, the method further comprising generating a first set of distinct paths, each of the paths denoting an estimated path for one of the estimated minimum number of corresponding sonic sources that, together with the other sonic sources of the estimated minimum number of the sonic sources, could have produced or generated the sonic events, by partitioning the set of sonic events into a first set of mutually disjoint subsets using the maximum matching, each path corresponding to one of the disjoint subsets, wherein every pairing of two different sonic events of a given path of the first set is classified as comparable.

19. The machine of claim 15 wherein part (a) comprises, for each one of a set of sonic events, using the machine, determining a temporal confidence interval corresponding to the sonic event and a spatial confidence interval corresponding to the sonic event using only data that are indicative of reception of sonic signals originating from the sonic sources.

20. An article comprising a tangible medium that is not a propagating signal encoding computer-readable instructions that, when applied to a computerized machine, program the computerized machine to perform a method comprising:
  (a) for each one of a set of sonic events, the sonic events of the set arising from an unknown number of sonic sources of a specified class of sonic sources, one or more of which sonic sources are in motion with respect to at least one receiver, determining a temporal confidence interval corresponding to the sonic event and a spatial confidence interval corresponding to the sonic event;
  (b) using the machine, chronologically ordering sonic events of the set of sonic events according to the temporal confidence intervals of part (a);
  (c) for each pairing of two different sonic events of the set arranged in the chronological order of part (b), using the machine, classifying that pairing as comparable only when that pairing meets a set of one or more preselected constraints, at least some of which constraints depend on the temporal confidence intervals and the spatial confidence intervals;
  (d) using the machine, separating the pairings of sonic events into one or more disjoint subsets, wherein, for each of the subsets, no sonic event of a subset is comparable with any of the sonic events outside that subset and each sonic event of the subset is comparable with at least one other sonic event of the subset; and
  (e) using the machine, for each of the disjoint subsets, calculating the number of sonic events minus the cardinality of a maximum matching of a bipartite graph, wherein:
    (i) each edge of the bipartite graph connects a first vertex representing a first sonic event of the disjoint subset to a second vertex representing a second sonic event of the disjoint subset according to the chronological order of part (b), which second sonic event of the disjoint subset is comparable with the first sonic event of the disjoint subset according to the classifying in part (c); and (ii) the maximum matching is the maximum number of edges of the bipartite graph that do not share a common one of the vertices of the bipartite graph; and (f) using the machine, estimating a minimum number of sonic sources that could have produced or generated the set of sonic events by equating the estimated minimum number of sonic sources to the sum of the calculated numbers in part (e) for all of the disjoint subsets.

21. The article of claim 20 wherein the set of one or more preselected constraints includes the constraint that, for each pairing classified as comparable, either (i) the corresponding spatial confidence intervals overlap, or (ii) a minimum distance between the corresponding non-overlapping spatial confidence intervals, divided by a maximum time span encompassed by the corresponding temporal confidence intervals, is less than or equal to a preselected maximum speed of sonic sources of the specified class.

22. The article of claim 21 wherein the set of one or more preselected constraints further includes, for each pairing classified as comparable, one or more of (i) a maximum distance encompassed by the corresponding spatial confidence intervals, divided by a minimum time span encompassed by the corresponding temporal confidence intervals, is greater than or equal to a preselected minimum speed of sonic sources of the specified class, (ii) a time span separating the corresponding temporal confidence intervals being greater than a preselected minimum time between sonic events for sonic sources of the specified class, or (iii) a corresponding turning rate being less than a preselected maximum turning rate for sonic sources of the specified class.

23. The article of claim 20, the method further comprising generating a first set of distinct paths, each of the paths denoting an estimated path for one of the estimated minimum number of corresponding sonic sources that, together with the other sonic sources of the estimated minimum number of the sonic sources, could have produced or generated the sonic events, by partitioning the set of sonic events into a first set of mutually disjoint subsets using the maximum matching, each path corresponding to one of the disjoint subsets, wherein every pairing of two different sonic events of a given chain of the first set is classified as comparable.

24. The article of claim 20 wherein part (a) comprises, for each one of a set of sonic events, using the machine, determining a temporal confidence interval corresponding to the sonic event and a spatial confidence interval corresponding to the sonic event using only data that are indicative of reception of sonic signals originating from the sonic sources.

* * * * *